US009569342B2

(12) United States Patent
Bijanki et al.

(10) Patent No.: US 9,569,342 B2
(45) Date of Patent: Feb. 14, 2017

(54) TEST STRATEGY FOR PROFILE-GUIDED CODE EXECUTION OPTIMIZERS

(71) Applicant: Microsoft Corporation, Redmond, WA (US)

(72) Inventors: Arjun Bijanki, Kirkland, WA (US); Sandeep Agarwal, Redmond, WA (US); Curtis Man, Seattle, WA (US); Louis Lafreniere, Seattle, WA (US); Ritesh Parikh, Redmond, WA (US); Sankar Sundaram, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 723 days.

(21) Appl. No.: 13/721,641

(22) Filed: Dec. 20, 2012

(65) Prior Publication Data

US 2014/0181591 A1 Jun. 26, 2014

(51) Int. Cl.
G06F 11/00 (2006.01)
G06F 11/36 (2006.01)
G06F 11/34 (2006.01)
G06F 9/455 (2006.01)

(52) U.S. Cl.
CPC ......... *G06F 11/3684* (2013.01); *G06F 9/4552* (2013.01); *G06F 11/34* (2013.01); *G06F 11/3676* (2013.01); *G06F 11/3696* (2013.01)

(58) Field of Classification Search
CPC .............. G06F 11/3676; G06F 11/3684; G06F 11/3696
USPC ......................................... 714/38.1; 717/128
See application file for complete search history.

(56) References Cited

U.S. PATENT DOCUMENTS 6,530,075 B1 * 3/2003 Beadle et al. ................ 717/114
8,136,095 B2 * 3/2012 Natanov ............. G06F 11/3684
717/101

8,543,907 B1 * 9/2013 Roskind ........................ 715/234
8,745,592 B1 * 6/2014 Ormandy ............ G06F 11/3684
717/124

(Continued)

FOREIGN PATENT DOCUMENTS

EP 1632853 A1 3/2006

OTHER PUBLICATIONS

International Search Report & Written Opinion for PCT Patent Application No. PCT/US2013/076844, Mailed Date: Mar. 14, 2014, Filed Date: Dec. 20, 2013, 13 Pages.
Arnold, et al., "A Survey of Adaptive Optimization in Virtual Machines", In IEEE, vol. 93, Issue 2, Feb. 2005, pp. 449-466.
Vaswani, et al., "Dynamic recompilation and profile-guided optimisations for a NET JIT compiler", Retrieved at <<http://ieeexplore.ieee.org/stamp/stamp.jsp?tp=&arnumber=1249340&userType=inst>>, Software, IEE Proceedings, Oct. 27, 2003, pp. 7.

(Continued)

*Primary Examiner* — Elmira Mehrmanesh
(74) *Attorney, Agent, or Firm* — Kevin Sullivan; Kate Drakos; Micky Minhas

(57) ABSTRACT

Systems, methods and computer program products are described herein for testing a system that is designed to optimize the execution of code within an application or other computer program based on profile data collected during the execution of such code. The embodiments described herein utilize what is referred to as a "profile data mutator" to mutate or modify the profile data between the point when it is collected and the point when it is used to apply an optimization. By mutating the profile data at this point, testing of a system for optimized code execution can be significantly more thorough. Furthermore, such profile data mutation leads to a more scalable and efficient testing technique for profile-guided systems for optimized code execution.

20 Claims, 10 Drawing Sheets

(56) References Cited

U.S. PATENT DOCUMENTS

| | | | |
|---|---|---|---|
| 8,819,649 B2* | 8/2014 | Lafreniere et al. | 717/139 |
| 2004/0268309 A1* | 12/2004 | Grover et al. | 717/120 |
| 2005/0097534 A1 | 5/2005 | Clement et al. | |
| 2007/0240135 A1* | 10/2007 | Stoodley et al. | 717/140 |
| 2009/0024986 A1* | 1/2009 | Meijer | G06F 8/437 717/137 |
| 2009/0089767 A1* | 4/2009 | Daynes et al. | 717/148 |
| 2010/0037100 A1* | 2/2010 | Lopian | 714/35 |
| 2010/0138811 A1 | 6/2010 | Jayaraman et al. | |
| 2010/0235819 A1 | 9/2010 | Rose | |
| 2011/0035735 A1* | 2/2011 | Kramp et al. | 717/148 |
| 2011/0191848 A1* | 8/2011 | Zorn et al. | 726/22 |
| 2011/0314452 A1* | 12/2011 | Tillmann | 717/128 |
| 2012/0222013 A1* | 8/2012 | Zheng | G06F 11/3612 717/125 |
| 2012/0304160 A1* | 11/2012 | Soeder | 717/148 |
| 2013/0061128 A1* | 3/2013 | Lucco et al. | 715/234 |
| 2013/0067441 A1 | 3/2013 | Lafreniere et al. | |
| 2013/0227388 A1* | 8/2013 | Trunley et al. | 715/234 |
| 2014/0082597 A1* | 3/2014 | Chafi et al. | 717/148 |

OTHER PUBLICATIONS

Kirner, Raimund, "SCCP/x—A Compilation Profile to Support Testing and Verification of Optimized Code", Retrieved at <<http://www.vmars.tuwien.ac.at/~raimund/papers/rr-2007-045_cases07_sccpx.pdf>>, In Proceedings of Cases, Sep. 30, 2007, pp. 5.

Double, Chris, "Dynamic Compilation and Loading of Modules in Haskell", Retrieved at <<http://www.bluishcoder.co.nz/2008/11/dynamic-compilation-and-loading-of.html>>, Nov. 24, 2008, pp. 3.

Whaley, John., "Partial Method Compilation using Dynamic Profile Information", Retrieved at <<http://suif.stanford.edu/~jwhaley/papers/oopsla01.pdf>>, Proceedings of the 16th ACM SIGPLAN conference on Object-oriented programming, systems, languages, and applications, Feb. 21, 2012, pp. 14.

Begel, et al., "PicoThreads: Light-Weight Threads in Java", Retrieved at <<http://research.microsoft.com/en-us/um/people/abegel/cs262-paper.html>>, Retrieved Date: Jul. 25, 2012, pp. 8.

"Profile Guided Jit Code Generation", U.S. Appl. No. 13/229,594, filed Sep. 9, 2011, pp. 53.

* cited by examiner

TEST STRATEGY FOR PROFILE-GUIDED CODE EXECUTION OPTIMIZERS

BACKGROUND

Many types of programming languages exist. One form of programming language is a scripting language. A scripting language is a programming language that enables control of one or more applications. A "script", or program generated according to a scripting language, may be written in a same language or a different language from that of an associated application. While applications are typically first compiled to native machine code, scripts are often interpreted from source code.

Another form of programming language is a dynamic programming language. A dynamic programming language is a programming language that performs some behaviors during runtime that other programming languages (that are not dynamic) may perform during compilation. Such behaviors may include extending a program by adding new code, extending objects and definitions, and/or modifying the type system. Many scripting programming languages are also dynamic programming languages.

A web browser is an application for rendering web pages for display. Scripts are frequently run on web pages in order to dynamically change their content. Client-side scripting generally refers to scripts that are executed client-side by a web browser rather than being executed server-side on a web server. Client-side scripting can make web pages more responsive to user input by avoiding one or more round trip communications with the web server.

Scripts written in dynamic programming languages are difficult to execute efficiently. For instance, ECMAScript (a scripting language standardized by Ecma International in the ECMA-262 specification and ISO/IEC 16262) is an example dynamic programming language used in scripts that is very flexible. In many ECMAScript programs, only a portion of the ECMAScript code is executed, and an even smaller portion of the ECMAScript code is run during the program start-up. As such, parsing of the entire code base unnecessarily delays the start of execution. In addition, most code actually written in ECMAScript does not exploit the full range of the ECMAScript language's flexibility. However, the machine code generated by an ECMAScript compiler is generated to correctly handle a wide spectrum of possibilities at runtime, which results in inefficient execution.

Systems exist that optimize the manner in which scripts written in dynamic programming languages are executed, so that such scripts may be executed more efficiently. For example, commonly-owned co-pending U.S. patent application Ser. No. 13/229,594 to Lafreniere et al., entitled "Profile Guided JIT Code Generation" and filed on Sep. 9, 2011, describes a runtime engine that is configured to execute a script and to collect and store profile data concerning the script during such execution. The runtime engine is further configured to use such profile data to perform just-in-time (JIT) compilation of selected portions of the script. The JIT-compiled portions of the script are then used to execute the script in a more efficient manner than if the script were executed only by a script interpreter. Still other systems may exist that can optimize the execution of a script (or other code) based on profile data that is collected during execution thereof.

The aforementioned profile data represents a sample of the script's historical behavior. It does not necessarily represent what the script will do in the future. Thus, any optimizations applied to the manner of execution of the script based on the profile data must be implemented in such a manner that the optimizations will behave correctly even if the script's behavior changes. For example, changes in the behavior of the script should not cause program crashes or incorrect functional behavior. It would be beneficial, then, if the applied optimizations could be tested at a point when the script is behaving in a manner that deviates from the pattern of behavior represented by the profile data.

Most scripts, however, do not significantly change their behavior from when profile data is collected to when optimizations based on such profile data have been applied. This makes application of certain testing techniques less useful in verifying that the system for optimizing script execution is behaving correctly. For example, a web crawler may be used to test the system for optimizing script execution by causing the system to execute scripts included within a series of sequentially-accessed web pages. However, it has been observed that most web page scripts do not significantly change their behavior from when profile data about such scripts is collected to when optimizations based on such profile data have been applied.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system is described herein that includes one or more processing units and a memory that is coupled to the one or more processing units. The memory stores software modules for execution by the one or more processing units. The software modules include a runtime engine and a profile data mutator. The runtime engine is configured to execute a script, to collect profile data concerning the script during execution thereof, and to perform JIT compilation of selected portions of the script based on the profile data to obtain efficient execution thereof. The profile data mutator is configured to modify one or more profile data entities within the profile data to facilitate testing of the runtime engine.

A computer-implemented method is also described herein. The computer-implemented method is for testing a system that is configured to execute a script, to collect profile data concerning the script during execution thereof, and to perform JIT compilation of selected portions of the script based on the profile data to obtain efficient execution thereof. In accordance with the method, one or more profile data entities within the profile data are modified. Then, the one or more modified profile data entities are provided to a JIT compiler that performs the JIT compilation of the selected portions of the script based on the profile data to obtain efficient execution thereof.

A method for testing a profile-guided code execution optimizer is also described herein. The profile-guided code execution optimizer is configured to execute code, to collect profile data concerning the code during execution thereof, and to implement optimizations to the execution of the code based on the profile data. In accordance with the method, the profile data is received. One or more profile data entities within the profile data are then modified. The one or more modified profile data entities are then provided to the profile-guided code execution optimizer that optimizes at least a portion of the code based on the one or more modified profile data entities.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
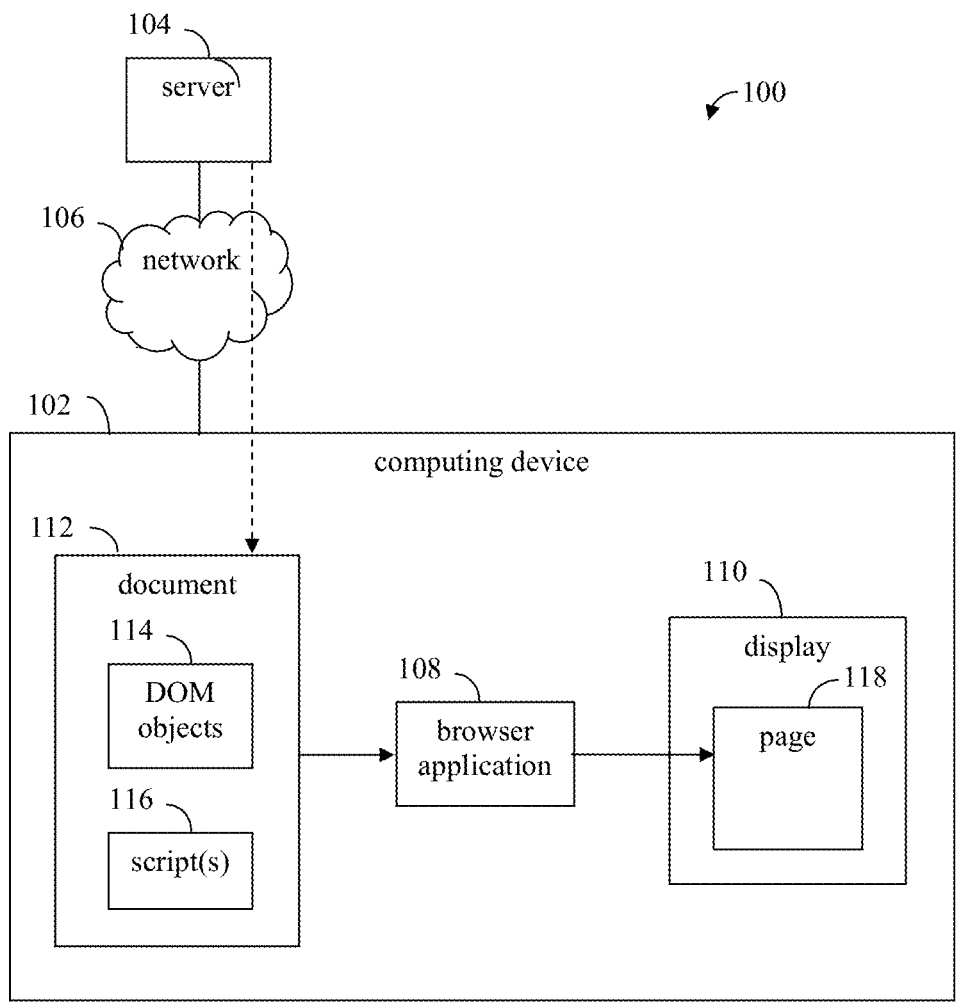
FIG. 1 is a block diagram of a computing device that includes a browser application configured to render pages from received documents, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It noted that any section/subsection headings provided herein are not intended to be limiting. Embodiments are described throughout this document, and any type of embodiment may be included under any section/subsection.

Systems, methods and computer program products are described herein for testing a system that is designed to optimize the execution of code within an application or other computer program. In particular, embodiments described herein may be used to test a system that is designed to optimize the execution of scripts written in dynamic programming languages based on profile data collected during the execution of such scripts. For example, the approach to testing described herein may be applied to a system such as that described in commonly-owned co-pending U.S. patent application Ser. No. 13/229,594 to Lafreniere et al., entitled "Profile Guided JIT Code Generation" and filed on Sep. 9, 2011 ("the '594 application"), the entirety of which is incorporated by reference herein. The '594 application describes a runtime engine that is configured to execute a script and to collect and store profile data concerning the script during such execution. The runtime engine is further configured to use such profile data to perform JIT compilation of selected portions of the script. The JIT-compiled portions of the script are then used to execute the script in a more efficient manner than if the script were executed only by a script interpreter.

It is noted, however, that the systems, methods and computer program products described herein are not limited to testing the system for optimized code execution described in the '594 application, but may be used to test any system that can optimize the execution of a script (or other code) based on profile data that is collected during execution thereof.

The embodiments described herein utilize what is referred to as a "profile data mutator" to mutate or modify the profile data between the point when it is collected and the point when it is used to apply an optimization. In the case of the system described in the '594 application, this is the point between when the profile data is collected and when it is used by the JIT compiler to selectively compile a portion of the script. By mutating the profile data at this point, testing of a system for optimized code execution can be significantly more thorough. For example, if profile data is collected that indicates that a particular variable included in the script is an integer, mutating that profile data can cause the system for optimized code execution to treat the variable as a floating point number. The result is that a different optimization will be applied, improving the testing coverage, without having to change the script.

As will be described herein, the technique used to mutate the profile data can take a number of forms, including but not limited to: (1) random mutations; (2) user-specified mutations for each kind of field in the profile data; and (3) user-specified mutations for each field in the profile data. In accordance with technique (1), of the possible legal or valid values for each field in the profile data, a random value is chosen. In accordance with technique (2), all fields in the profile data of a particular type are given the same mutation as specified by a tester. In accordance with technique (3), the tester specifies a mutation for each field in the profile data.

The mutated profile data may then be used to test the system for optimized code execution. For example, in one implementation, an automated tool that crawls web sites and applications is utilized to obtain scripts for execution by the system while the profile data mutator is operating. A tester specifies a mutation technique with a series of flags which are passed to the profile data mutator. The profile data mutator then applies the requested mutations to all profile data which is collected by the system. The mutated profile data is used to optimize the execution of the scripts.

By using the mutated profile data, much more thorough coverage of optimizations and recovery scenarios is obtained as compared to traditional testing techniques such as manual testing or directed testing. This leads to a more scalable and efficient testing technique for profile-guided systems for optimized code execution. Thus, embodiments described herein enable a scalable, machine-driven method of testing the functional correctness of a profile-guided system for optimized code execution, by mutating the profile data during code execution.

A particular implementation of the testing method will be described herein in Section III. First, however, a description of an example system for performing profile-guided optimized code execution will be described in Section II. Such example system is consistent with the system described in the '594 application. Section III will then describe how such a system may be modified to perform the innovative testing method. Section IV will describe an example computer that may be used to implement various embodiments. Finally, Section V will provide some concluding remarks.

II. Example System for Applying Profile-Guided Code Execution Optimizations

An example system that applies profile-guided code execution optimizations will now be described in reference to FIGS. 1-13. Such a system may be tested using a testing strategy that will be described in Section III.

The example system for applying profile-guided code execution optimizations may be implemented in a variety of environments. For instance, FIG. 1 shows a block diagram of a web browsing environment 100 in which such a system may be implemented. As shown in FIG. 1, environment 100 includes a computing device 102, a server 104, and a network 106. As also shown in FIG. 1, computing device 102 includes a browser application 108. Environment 100 is described as follows. Environment 100 is provided for purposes of illustration, and it not intended to be limiting. The example system for applying profile-guided code execution optimizations may be implemented in further environments, as would be apparent to persons skilled in the relevant art(s) from the teachings herein.

Computing device 102 may be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, a Microsoft Windows® phone, etc.), or other type of mobile device. Server 104 may be implemented in one or more computer systems, including one or more servers, which may be any type of computing device described herein or otherwise known that is capable of enabling the corresponding functionality described herein.

Computing device 102 and server 104 are communicatively coupled by network 106. Network 106 may include one or more communication links and/or communication networks, such as a PAN (personal area network), a LAN (local area network), a WAN (wide area network), or a combination of networks, such as the Internet. Computing device 102 and server 104 may be communicatively coupled to network 106 using various links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, or the like.

A single computing device 102 is shown in FIG. 1 for purposes of illustration. However, any number of computing devices 102 may be present in environment 100, including tens, hundreds, thousands, and even greater numbers of computing devices 102. Each computing device may operate one or more corresponding browser applications.

Browser application 108 is a program that executes/operates in computing device 102. Browser application 108 enables network information resources to be retrieved, presented, and traversed. An information resource or object may be retrieved by browser application 108 using a network address, such as a uniform resource identifier (URI). Examples of information resources include web pages, images, videos, and other forms of content. Hyperlinks that are present in information resources enable users easily to navigate their browsers to related resources. Examples of browser application 108 include Internet Explorer®, published by Microsoft Corp. of Redmond, Wash., Mozilla Firefox®, published by Mozilla Corp. of Mountain View, Calif., Safari®, published by Apple Inc. of Cupertino, Calif., and Google® Chrome, published by Google Inc. of Mountain View, Calif.

As shown in FIG. 1, browser application 108 may retrieve a document 112 from a server 104 through network 106.

Document 112 may be a web document that includes code of a markup language, such as hyperText markup language (HTML), dynamic HTML (DHTML), extensible HTML (XHTML), extensible markup language (XML), etc. As shown in FIG. 1, document 112 includes DOM (document object model) objects 114 and one or more scripts 116. DOM objects 114 include one or more objects represented in document 112 according to the DOM convention, which is a cross-platform and language-independent convention for representing and interacting with objects. DOM objects 114 may include objects that are directly included in document 112, and/or are referenced by document 112 and separately retrieved from server 104 or other server. Script(s) 116 include code formatted according to a dynamic language (e.g., ECMAScript, VBScript, AJAX, Python, Perl, etc.) that enables changes to be made to DOM objects 114, including changes based on factors such as user input, environmental conditions (e.g., the time of day, or other variables), etc. The code of script(s) 116 can access and modify objects of DOM objects 114 on the fly without returning to server 104.

As shown in FIG. 1, browser application 108 receives (e.g., loads) document 112. Browser application 108 includes a browser engine (e.g., a layout engine or rendering engine) that formats information of document 112, and displays the formatted information. For example, as shown in FIG. 1, browser application 108 may generate a page 118 based on document 112 that is displayed by a display of computing device 102.

Figure 2:
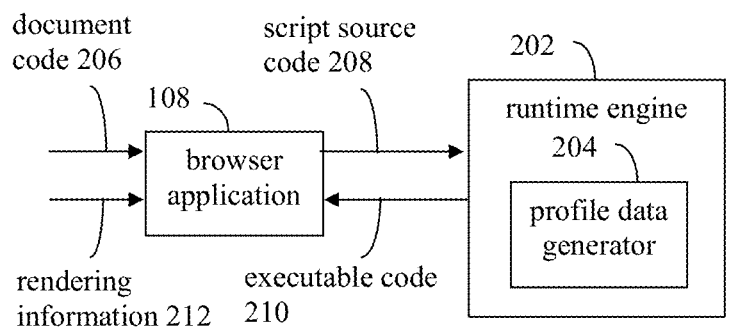
FIG. 2 is a block diagram of a browser application that interacts with a runtime engine configured to execute scripts and to generate profile information about the scripts, according to an example embodiment.

Browser application 108 may be configured to execute one or more scripts 116 that are embedded in document 112, or separate from but associated with document 112. For instance, FIG. 2 shows a block diagram of browser application 108 interacting with a runtime engine 202, according to an example embodiment. Runtime engine 202 is configured to execute scripts for browser application 108, such as script(s) 116 of FIG. 1. In one embodiment, runtime engine 202 may be separate from browser application 108 as shown in FIG. 2, such as a plug-in or add-in module to browser application 108. In another embodiment, runtime engine 202 may be integrated in browser application 108.

As shown in FIG. 2, browser application 108 receives document code 206, which is code in document 112 and/or referenced by document 112. A browser engine of browser application 108 executes document code 206. If browser application 108 encounters a script of document 112, browser application 108 may provide script source code 208 of the script to runtime engine 202 for execution. Runtime engine 202 is a runtime engine for scripts programmed in a dynamic programming language (or "dynamic language"). As such, runtime engine 202 enables dynamic typing and further features of dynamic languages. In an embodiment, runtime engine 202 may be implemented as a virtual machine (VM). With dynamically typed languages, such as ECMAScript, Python, etc., often it is not known what type various items of data may assume until the program code is actually executed. For instance, it may not be known whether a dynamically typed variable is an integer, a float, or a string until the code is actually executed by the runtime engine. Runtime engine 200 is configured to handle such dynamic capabilities of a dynamic language when executing source code 208.

Runtime engine 202 may generate executable code 210 based on executing script source code 208, which may be executed (e.g., by one or more processors). Browser application 108 may generate rendering information 212 based on the execution of document code 206 and based on executable code 210.

As shown in FIG. 2, runtime engine 202 includes a profile data generator 204. Profile data generator 204 is configured to analyze script source code 208 to collect statistics and further information about script source code 208. For instance, profile data generator 204 may determine frequently performed portions of script source code 208, startup portions of script source code 208, and/or further information regarding script source code 208. Profile data generator 204 may maintain the collected information as profile data. Runtime engine 202 may use the collected profile data to more efficiently execute script source code 208, as described herein.

Figure 3:
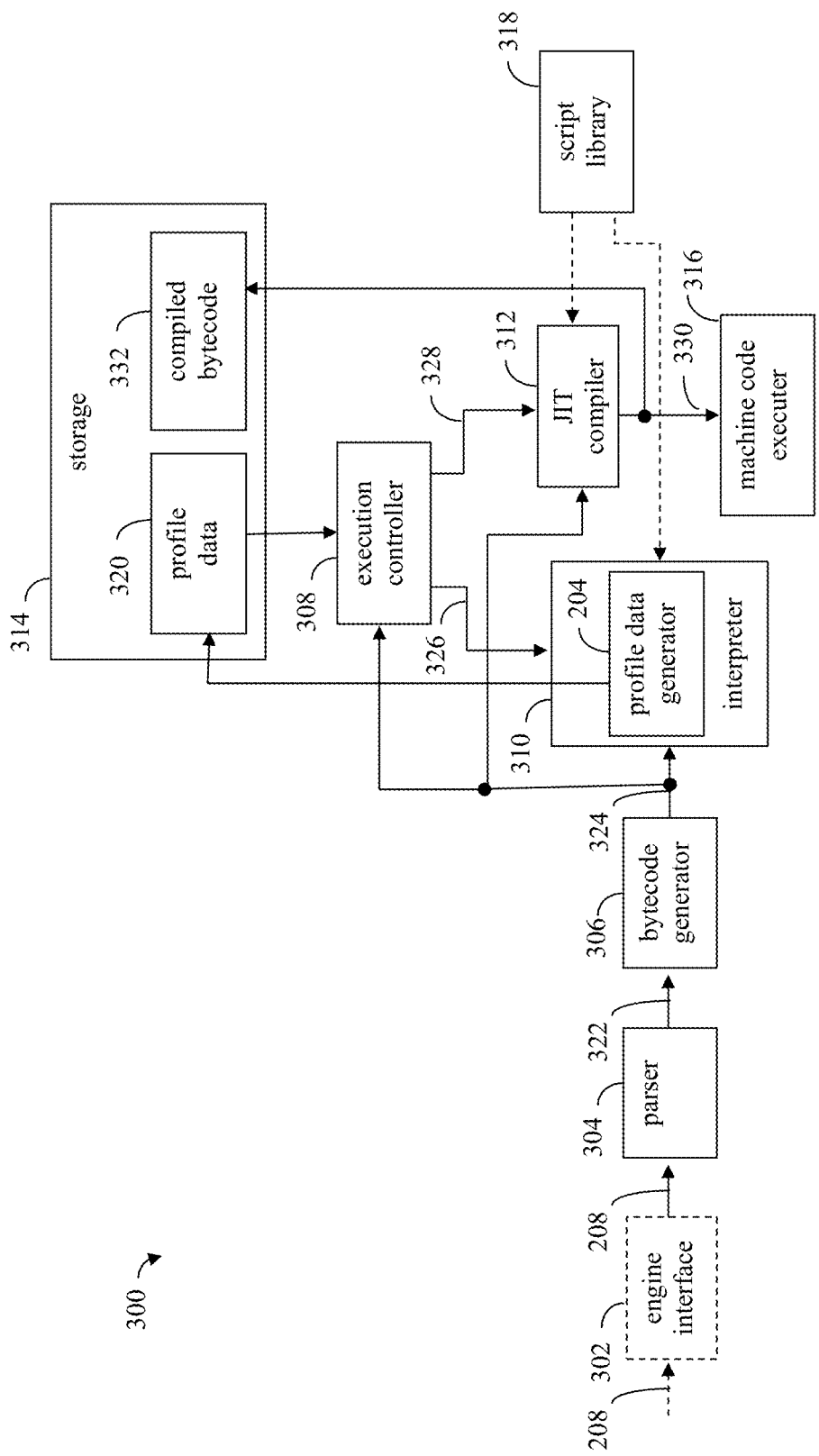
FIG. 3 is a block diagram of a runtime engine configured to interpret portions of a script and to execute compiled portions of the script based on profile information generated based on the script, according to an example embodiment.

According to an example embodiment, a runtime engine (such as runtime engine 202 of FIG. 2) is configured to collect profile information regarding a script being executed, and to use the profile information to improve script execution performance. Such runtime engines may be configured in various ways, in embodiments. For instance, FIG. 3 shows a block diagram of a runtime engine 300, according to an example embodiment. As shown in FIG. 3, runtime engine 300 includes an engine interface 302, a parser 304, a bytecode generator 306, an execution controller 308, an interpreter 310, a JIT (just-in-time) compiler 312, storage 314, a machine code executer 316, and a script library 318. Runtime engine 300 is described as follows.

As shown in FIG. 3, engine interface 302 receives script source code 208. Engine interface 302 is optionally present, and in some embodiments, parser 304 may be configured as an interface for runtime engine 300 rather than having engine interface 302 present. When present, engine interface 302 is a communication interface that provides one or more methods for interfacing a host with runtime engine 300. In one example, embodiment, engine interface 302 may be implemented according to IActiveScript developed by Microsoft Corporation of Redmond, Wash. As shown in FIG. 3, engine interface 302 provides source code 208 to parser 304.

Parser 304 receives and parses source code 208. For instance, parser 304 may perform token generation or lexical analysis on source code 208, so that source code 208 is formatted into symbols or tokens. Parser 304 may perform error checking on the tokens to determine whether allowable expressions are formed, that syntax errors are not present, etc. As shown in FIG. 3, parser 304 outputs the parsed source code as parsed source code 322. Parsed source code 322 may have any suitable form, including being generated by parser 304 as AST (abstract syntax tree) code, which includes a tree representation of the abstract syntactic structure of source code 208, as would be known to persons skilled in the relevant art(s).

As shown in FIG. 3, bytecode generator 306 receives parsed source code 322. Bytecode generator 306 is configured to convert parsed source code 322 into bytecode, which includes instruction sets configured for efficient execution by an interpreter, as well as for further compilation into machine code. For instance, generated bytecode may represent parsed source code 322 as numeric codes and corresponding optional parameters. As shown in FIG. 3, bytecode generator 306 outputs the generated bytecode as bytecode 324. Bytecode 324 may have any suitable form, including being generated by bytecode generator 306 in the form of p-code (portable code), as would be known to persons skilled in the relevant art(s).

As shown in FIG. 3, execution controller 308, interpreter 310, and JIT compiler 312 each receive bytecode 324. Furthermore, as shown in FIG. 3, interpreter 310 includes profile data generator 204. Profile data generator 204 is configured to analyze bytecode 324 to collect statistics and further information regarding source code 208. Profile data generator 204 generates profile data 320, which includes the collected information, and which is stored in storage 314.

As shown in FIG. 3, execution controller 308 accesses profile data 320, and is communicatively coupled to interpreter 310 and JIT compiler 312. Based on bytecode 324 and profile information 320, execution controller 308 may enable one of interpreter 310 and JIT compiler 312 to operate on bytecode 324. Interpreter 310 is configured to interpret bytecode 324 when enabled by an interpreter control signal 326 received from execution controller 308. JIT compiler 312 is configured to compile bytecode 324 when enabled by a compiler control signal 328 received from execution controller 308. For instance, during a first execution of source code 208, profile data 320 may not yet exist. In such case, execution controller 308 may enable interpreter 310 to interpret bytecode 324 and to generate profile data 320. During subsequent execution of source code 208 (e.g., later during the same first execution of source code 208, and/or during a subsequent execution of source code 208), execution controller 308 may enable interpreter 310 to interpret portions of source code 208, and may enable JIT compiler 312 to compile other portions of source code 208, based on profile data 320.

When interpreter 310 is enabled by interpreter control signal 326, interpreter 310 interprets and executes bytecode 324. For instance, interpreter 310 may be implemented as an ECMAScript interpreter, a VBScript interpreter, a Python interpreter, or as an interpreter for another dynamic language mentioned elsewhere herein or otherwise known. In this manner, source code 208 may be at least partially executed by operation of interpreter 310.

When JIT compiler 312 is enabled by compiler control signal 328, JIT compiler 312 compiles bytecode 324. For instance, JIT compiler 312 may be implemented as an ECMAScript compiler, a VBScript compiler, a Python compiler, or as a compiler for another dynamic language mentioned elsewhere herein or otherwise known. JIT compiler 312 is referred to as a "just in time" compiler, because particular bytecode portions may be compiled by JIT compiler 312 as the compiled bytecode is needed (e.g., is going to be executed imminently) rather than pre-compiling bytecode 324 in its entirety prior to execution. As shown in FIG. 3, JIT compiler 312 generates compiled bytecode 330, which has the form of machine executable code or instructions. Compiled bytecode 330 is received by machine code executer 316 (e.g., one or more processors), which executes compiled bytecode 330. In this manner, source code 208 may be partially executed by operation of JIT compiler 312 and machine code executer 316. Furthermore, as shown in FIG. 3, compiled bytecode 330 may be stored in storage 314 as compiled bytecode 332 for access during subsequent execution of source code 208 by runtime engine 300.

Figure 4:
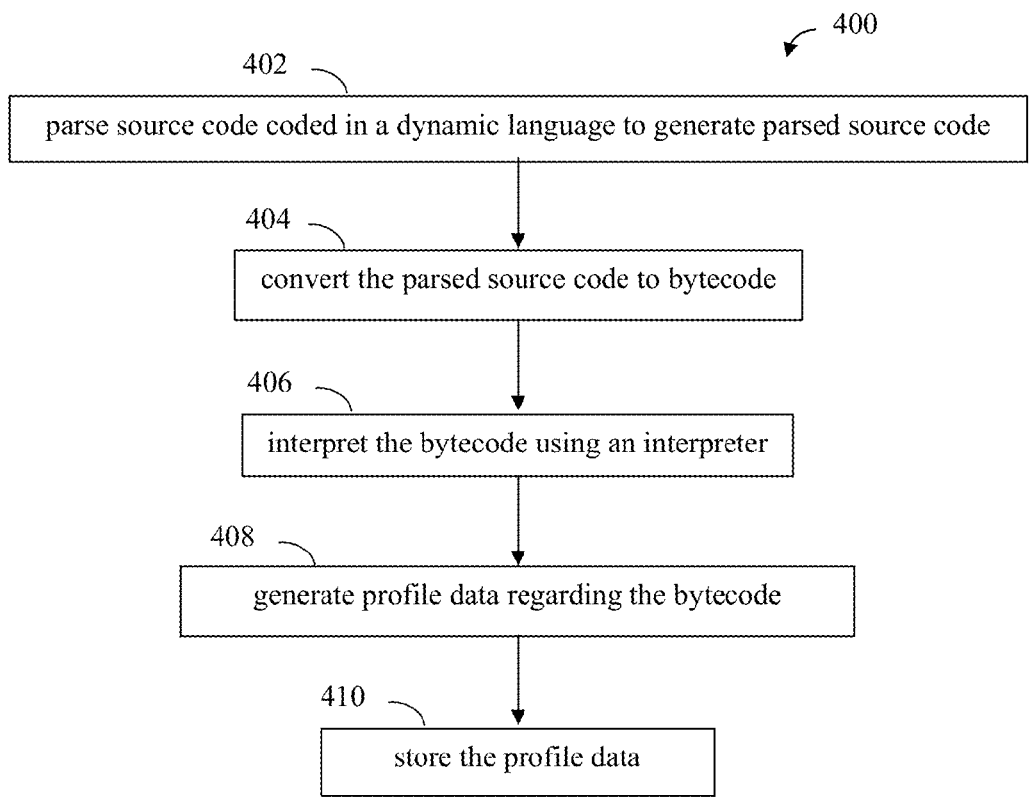
FIG. 4 depicts a flowchart of a method for executing a script and generating profile information for the script, according to an example embodiment.

Runtime engine 300 of FIG. 3 may operate in various ways to perform its functions. For instance, FIG. 4 shows a flowchart 400 of a method for executing a script and generating profile data for the script, according to an example embodiment. The method of flowchart 400 is described as follows with reference to FIG. 3. Further structural and operational embodiments will be apparent to persons skilled in the relevant art(s) based on the following discussion regarding flowchart 400.

The method of flowchart 400 begins with step 402. In step 402, source code coded in a dynamic language is parsed to generate parsed source code. For example, as shown in FIG. 3, parser 304 receives script source code 208 (optionally through engine interface 302). As described above, parser 304 is configured to parse source code 208 into parsed source code 322.

In step 404, the parsed source code is converted to bytecode. For instance, as shown in FIG. 3, bytecode generator 306 receives parsed source code 322. As described above, bytecode generator 306 is configured to convert parsed source code 322 into bytecode 324. Note that steps 402 and 404 may be considered together as a process for generating bytecode 324 from received source code 208 and may be performed in other ways, in embodiments.

In step 406, the bytecode is interpreted using an interpreter. For example, as shown in FIG. 3, interpreter 310 receives bytecode 324. As described above, interpreter 310 is configured to interpret bytecode 324. For instance, interpreter 310 may interpret bytecode 324 by translating bytecode 324 to an efficient intermediate code representation, and executing the intermediate code representation, or interpreting bytecode 324 in another manner to perform program execution.

In step 408, profile data regarding the bytecode is generated. For example, as shown in FIG. 3, profile data generator 204 receives bytecode 324. Profile data generator 204 is configured to analyze bytecode 324 to collect statistics and further information regarding source code 208. Profile data generator 204 generates profile data 320, which includes the collected information.

In step 410, the profile data is stored. For example, as shown in FIG. 3, profile data generator 204 stores profile data 320 in storage 314. Note that storage 314 may include one or more of any type of storage mechanism, including a magnetic disc (e.g., in a hard disk drive), an optical disc (e.g., in an optical disk drive), a magnetic tape (e.g., in a tape drive), a memory device such as a RAM (random access memory) device, etc., and/or any other suitable type of storage medium.

Note that runtime engine 300 and/or flowchart 400, when implemented as code that is executed in one or more processors, may be distributed over one or more program execution threads in any manner. For instance, in one example, parser 304, bytecode generator 306, execution controller 308, and interpreter 310 may operate in a first thread (e.g., a foreground or UI thread), and JIT compiler 312 may operate in a second thread (e.g., a background thread). In other embodiments, runtime engine 300 may be distributed over threads in other ways.

Figure 5:
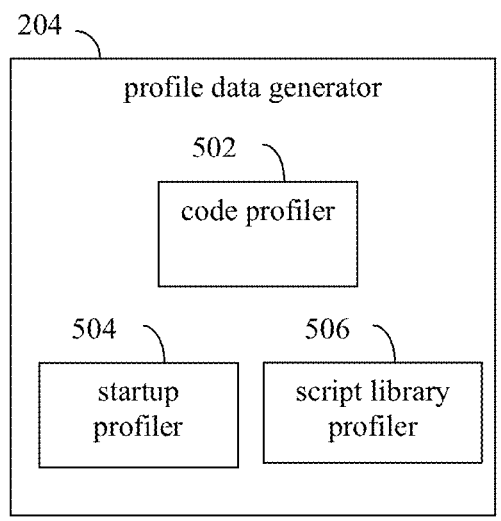
FIG. 5 is a block diagram of a profile generator, according to an example embodiment.
Figure 6:
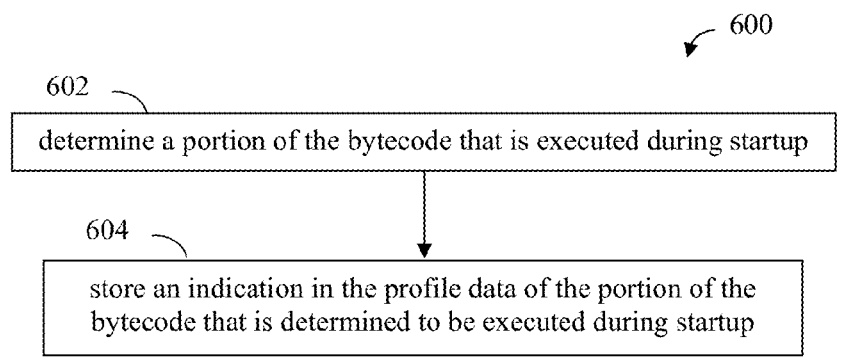
FIG. 6 depicts a flowchart of a method for indicating a startup portion of a script in profile data, according to an example embodiment.

As described above with respect to FIGS. 3 and 4, profile data generator 204 is configured to analyze bytecode 324 to collect statistics and further historical information regarding source code 208, to generate profile data 320. Profile data generator 204 may be configured in various ways to perform its functions. For instance, FIG. 5 shows a block diagram of profile data generator 204, according to an example embodiment. As shown in FIG. 5, profile data generator 204 includes a code profiler 502, a startup profiler 504, and a script library profiler 506. In embodiments, profile data generator 204 may include any one or more of these features. Profile data generator 204 of FIG. 5 is described as follows.

Code profiler 502 is configured to analyze bytecode 324 for patterns that occur multiple times, and to generate statistics and/or other historical information regarding the patterns, which is included in profile data 320. The historical pattern information may be used to detect the presence of frequently executed functions ("hotspots"), loop bodies, helper calls, property accesses, etc., in bytecode 324. By indicating the presence of such patterns, the historical pattern information may be used to more efficiently execute source code 208, such as by enabling machine code to be generated for commonly-occurring patterns.

For instance, code profiler 502 may monitor and track how many times a particular script function is performed in bytecode 324 during execution of source code 208. In profile data 320, code profiler 502 may indicate an identifier or a name of the function (in bytecode or other form) in association with a number of times the function is performed during execution of bytecode 324.

In an embodiment, each function of a script may have a corresponding function identifier (e.g., a numeric identifier, an alphanumeric identifier, etc.) assigned to it in profile data 320. The function identifiers may be generated in any manner (e.g., by sequentially numbering the functions as each function is profiled, generating a hash value for each function, etc.), and may be used to uniquely identify each function in profile data 320 for any purpose. For instance, an index may be stored that maps functions in bytecode 324 to their corresponding identifiers. During subsequent executions of source code 208, each time a function is encountered in bytecode 324, the index may be accessed to determine the identifier assigned to the function. Then, the identifier may be located in profile data 320 to locate any stored profile information for the function.

In another example, code profiler 502 may monitor and track how many times a particular loop of code ("code loop" or "loop body") is performed in bytecode 324 during execution of source code 208. In profile data 320, code profiler 502 may indicate a start instruction and a finish instruction for the code loop to identify the code loop, for example, or may indicate the code loop in another manner. Code profiler 502 may indicate a number of times the code loop is performed in association with the identified code loop.

In another example, code profiler 502 may monitor and track objects (e.g., variables) in bytecode 324. For instance, in profile data 320, code profiler 502 may indicate an object, and may indicate one or more of a type of the object (e.g., an integer, a floating point value, etc.), a shape of the object (e.g., the properties of the object), and/or other object features each time that the object is accessed and/or modified. In further examples, code profiler 502 may monitor and track features of arrays (e.g.: array type or array bounds), values of object properties, etc.

Code profiler 502 may also indicate in profile data 320 any portions of bytecode 324 that are not used (not executed), including any functions, objects, loops, etc., that are not used. For example, source code 208 may include errors in coding that lead to portions of code that are not used, may include utilities or library modules that are not used (e.g., may only use a portion of a library that is included in source code 208 in its entirety), and/or may include test code that was used during source code testing but is not during normal operation. In embodiments, during source code execution, execution controller 308 may instruct parser 304 to not parse (or partially parse) portions of bytecode 324 indicated as not used in profile data 320, to increase execution efficiency.

In further embodiments, code profiler 502 may track generate further statistics and/or other historical information regarding bytecode 324, and may include the historical information in profile data 320.

Startup profiler 504 is configured to analyze bytecode 324 for bytecode that is used at the beginning of the execution of source code 208, and to indicate this "startup" bytecode in profile data 320. For example, in an embodiment, startup profiler 504 may perform a method depicted in a flowchart 600 of FIG. 6. Flowchart 600 depicts a metho for indicating a startup portion of source code in profile data, according to an example embodiment. The method of flowchart 600 is described as follows.

The method of flowchart 600 begins with step 602. In step 602, a portion of the bytecode that is executed during startup is determined. For example, in an embodiment, startup profiler 504 may determine a startup portion of bytecode 324 that is executed first when execution of source code 208 begins. Startup profiler 504 may determine the startup portion of bytecode 324 in any manner, such as by determining a predetermined number of functions of bytecode 324 that occur when bytecode 324 is first received at profile data generator 204, determining a predetermined number of instructions (e.g., a predetermined number of lines of bytecode 324) that occur when bytecode 324 is first received at profile data generator 204, or in another manner.

In step 604, an indication is stored in the profile data of the portion of the bytecode that is determined to be executed during startup. For example, in an embodiment, startup profiler 504 may indicate the startup portion determined in step 602 in profile data 320. Startup profiler 504 may indicate the startup portion in profile data 320 in any manner, by indicating function names or identifiers, by indicating blocks of bytecode by line number, by indicating starting and ending instructions for the startup portion, or in any other manner.

Script library profiler 506 is configured to analyze bytecode 324 for any accesses to script library modules that are used during the execution of source code 208, and to indicate these accessed script library modules in profile data 320. For instance, as shown in FIG. 3, interpreter 310 and/or JIT compiler 312 may access a script library 318 during execution of source code 208. Script library 318 may include one or more library modules that include pre-coded functions. These pre-coded functions may be accessed by source code 208 so that a developer of source code 208 does not have to generate code for these functions, saving development time. For instance, script library 318 may be an ECMAScript library that includes modules of pre-coded ECMAScript, may be an AJAX library that includes modules of pre-coded AJAX, and/or may be a library for another dynamic language. The library modules of script library 318 may be parsed by parser 304 and converted by bytecode by bytecode generator 306, if needed, prior to being interpreted and/or compiled. In embodiments, during source code execution, execution controller 308 may instruct parser 304 to not parse library modules of script library 318 not indicated as used in profile data 320, to increase execution efficiency.

Figure 7:
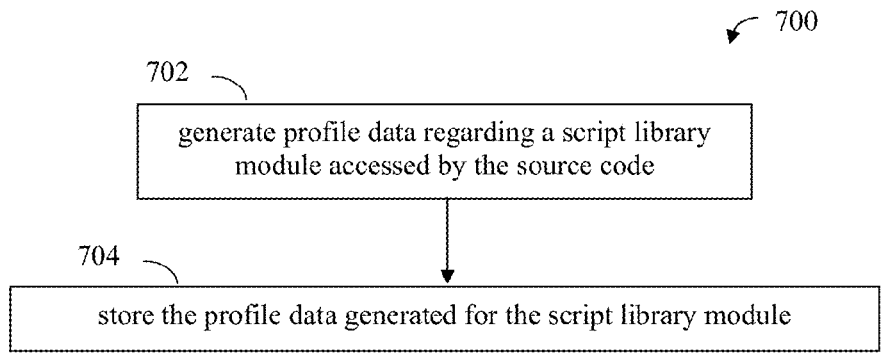
FIG. 7 depicts a flowchart of a method for generating profile data for a script library, according to an example embodiment.

In an embodiment, script library profiler 506 may perform a method depicted in a flowchart 700 of FIG. 7. Flowchart 700 depicts a method for generating profile information for a script library, according to an example embodiment. The method of flowchart 700 is described as follows.

The method of flowchart 700 begins with step 702. In step 702, profile data is generated regarding a script library module accessed by the source code. For example, in an embodiment, script library profiler 506 may determine any script library modules of script library 318 that are accessed by bytecode 324 during the execution of source code 208, and may indicate these accessed script library modules in profile data 320. Script library profiler 506 may indicate the accessed script library modules in any manner, including by module name, module storage location, etc.

In step 704, the profile data generated for the script library module is stored. For instance, as shown in FIG. 3, profile data 320, which may include the accessed library module profile information, may be stored in storage 314.

As described above with respect to FIGS. 3 and 4, the execution of script source code 208 by runtime engine 300 may be improved based on profile data 320. For instance, portions of bytecode 324 may be compiled and executed on the fly rather than being interpreted to improve script execution efficiency. In embodiments, to improve script performance, run time engine 300 may compile portions of a script for execution based on an analysis of script profile data.

Figure 8:
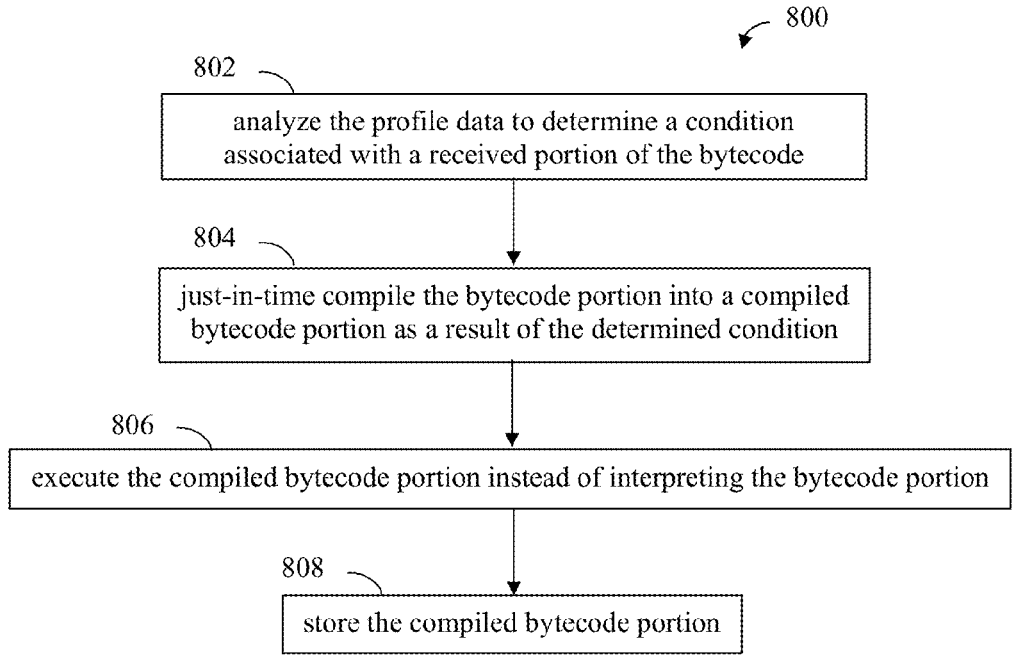
FIG. 8 depicts a flowchart of a method for compiling a portion of a script based on profile data for the script, according to an example embodiment.

For instance, FIG. 8 shows a flowchart 800 of a method for compiling a portion of a script based on profile data for the script, according to an example embodiment. In an embodiment, runtime engine 300 of FIG. 3 may perform the method of flowchart 800. Further structural and operational embodiments will be apparent to persons skilled in the relevant art(s) based on the following discussion regarding the method of flowchart 800.

The method of flowchart 800 begins with step 802. In step 802, the profile data is analyzed to determine a condition associated with a received portion of the bytecode. For example, as shown in FIG. 3, execution controller 308 receives bytecode 324 and profile data 320. In an embodiment, execution controller 308 may analyze profile data 320 to determine whether a portion of bytecode 324 may be interpreted, or may be compiled rather than interpreted to improve execution efficiency. Various conditions may be determined by execution controller 308 during the analysis that indicate that a received bytecode portion, such as a function, a loop body, a typed object, bytecode associated with an array, bytecode associated with an expression, or other bytecode portion, may be compiled to improve execution efficiency. For instance, if a function is called in bytecode 324 a predetermined number of times, it may be desirable for the function to be compiled rather than interpreted.

In step 804, the bytecode portion is just-in-time compiled into a compiled bytecode portion as a result of the determined condition. For example, as shown in FIG. 3, execution controller 308 may generate compiler control signal 328 to indicate to JIT compiler 312 to compile the bytecode portion. As such, when JIT compiler 312 is instructed by compiler control signal 328, JIT compiler 312 compiles the portion of bytecode 324 to generate compiled bytecode 330. Compiled bytecode 330 may be referred to as "jitted" bytecode or "jitted" code because it is compiled on request, just-in-time.

In step 806, the compiled bytecode portion is executed instead of interpreting the bytecode portion. For instance, as shown in FIG. 3, compiled bytecode 330 is received by machine code executer 316 (e.g., one or more processors), which executes compiled bytecode 330. Note that step 806 may or may not be performed, depending on the particular embodiment. For instance, in one embodiment, rather than interpreting the bytecode portion using interpreter 310, compiled bytecode 330 may be generated and executed. In another embodiment, the bytecode portion may be interpreted using interpreter 310, and compiled bytecode 330 may be generated but not executed. Instead, in such an embodiment, compiled bytecode 330 is generated so that it can be executed a next time the corresponding bytecode portion is encountered in bytecode 324.

In step 808, the compiled bytecode portion is stored. For instance, as shown in FIG. 3, compiled bytecode 330 may be stored in storage 314 for access during subsequent execution of source code 208 by runtime engine 300.

Figure 9:
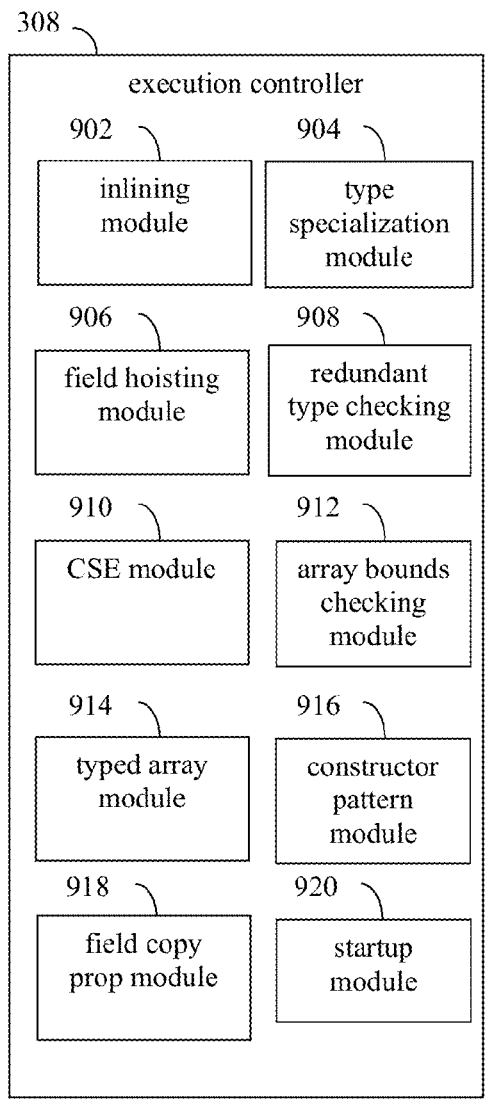
FIG. 9 is a block diagram of an execution controller that includes code optimization modules, according to an example embodiment.

Execution controller 308 may be configured in various ways to perform step 802 to detect various conditions in the profile data for selecting between interpreting and compiling bytecode. If one or more desired conditions are detected, it may be desired to generate compiled machine code to be executed rather than interpreting code. For instance, FIG. 9 shows a block diagram of execution controller 308 of FIG. 3, according to an example embodiment. As shown in FIG. 9, execution controller 308 includes a plurality of code execution optimizer modules, including an inlining module 902, a type specialization module 904, a field hoisting module 906, a redundant type checking module 908, a CSE (common sub-expression elimination) module 910, an array bounds checking module 912, a typed array module 914, a constructor pattern module 916, a field copy prop module 918, and a startup module 920. Any one or more of these code execution optimizer modules may be present in execution controller 308 to detect the presence of one or more corresponding conditions, and to perform an optimization (e.g., compiling particular bytecode to generate machine code, etc.) if the one or more conditions is/are detected. These features of execution controller 308 are described as follows.

Inlining module 902 is configured to analyze profile data 320 to determine conditions where bytecode portions of bytecode 324 may be performed multiple times without change to functions, objects, etc. within the bytecode portions. When inlining module 902 determines such a bytecode portion, inlining module 902 may replace the bytecode portion with machine code generated for the bytecode portion by JIT compiler 312, in effect "inlining" the machine code in bytecode 324. The machine code may be executed faster, improving overall program runtime efficiency. For instance, profile data 320 may indicate that a bytecode portion includes a first function that calls a second function. If profile data 320 indicates that the first function is called multiple times, and calls the second function each time, machine code for the second function may be generated that is used to replace the second function in the first function.

For instance, in the following example of ECMAScript, a first function "foo( )" may call a second function "bar( )" in source code 208:

```
function foo( )
{
  WScript.Echo("In foo( )");
  blah( );
}
function bar( )
{
  WScript.Echo("In bar( )");
}
blah = bar;
foo( );
```

When this code is executed, the following text is printed:
  In foo( )
  In bar( )
However, the assignment "blah=bar" may be hidden in various ways. In such case, JIT compiler 312 may not be able to determine statically what code will be executed when calling blah( ), and blah( ) could be calling different functions at different invocations of the function foo( ). Profile data 320 may indicate to inlining module 902 that, in this case, the assignment "blah( )" always calls "bar( )". As such, JIT compiler 312 may generate machine code that is equivalent to the following script code:

```
function foo( )
{
    WScript.Echo("In foo( )");
    if (blah == bar)
        WScript.Echo("In bar( )");
    else
        bailout_to_interpreter( );
}
```

In this example, machine code for the function "bar( )" is inlined into the function "foo( )" by inlining module 902. This increases program efficiency by avoiding the overhead of making a separate call to "bar( )". Furthermore, in this example, "foo( )" may be configured by inlining module 902 such that a "bailout" may occur if "blah( )" does not call "bar( )". In such a case, the original ECMAScript script shown above may be performed (by interpreter 310) rather than the version of "foo( )" with inlined machine code for "bar( )". Bailouts are described in additional detail further below.

Type specialization (TS) module 904 is configured to analyze profile data 320 to determine conditions where bytecode portions of bytecode 324 contain typed objects that maintain a same type during multiple executions by interpreter 310 (e.g., a predetermined number of times, such as 2 times, 5 times, of other predetermined number of times). When TS module 904 determines such a bytecode portion, TS module 904 may direct JIT compiler 312 (via signal 328) to compile the bytecode portion into machine code, with the object having the same type as has been repeatedly used. During source code execution, execution controller 308 may point to the generated machine code, which can be executed faster than interpreter 310 can interpret the bytecode portion.

For example, with respect to ECMAScript, an expression may have typed objects x, y, and w, as shown below:

```
{
    x = y + w;
}
```

TS module 904 may determine from profile data 320 that y and w have consistent types over multiple previous executions by interpreter 310 (e.g., being of type integer, floating point, string, etc.). If their types are consistent (e.g., floating point), TS module 904 may direct JIT compiler 312 to compile their bytecode into machine code that assumes that y and w are of the type that has previously been occurring. Machine code may be generated to perform the addition of "y+w" with the assumption that y and w are their particular recurring types (e.g., floating point). This increases program efficiency by avoiding the overhead of handling the possibility that their types may change from one execution iteration to a next execution iteration, as is possible in a dynamic language.

Field hoisting module 906 is configured to analyze profile data 320 to determine whether any implicit calls are present in bytecode 324 that may disallow JIT compiler 312 from performing field hoisting. To perform field hoisting, JIT compiler 312 may determine portions of bytecode 324 that contain objects with properties that maintain a same value during multiple executions by interpreter 310 (e.g., a predetermined number of times, such as 2 times, 5 times, of other predetermined number of times), such as during a loop. In such cases, JIT compiler 312 may compile the bytecode portion into machine code, to reference the previously used object property value in a register or other location, where it has been loaded. Field hoisting module 906 may analyze profile data 320 to determine whether there are any implicit calls in the loop, as these could undesirably modify property values. If no implicit calls are present, the machine code may be generated and used. If implicit calls are present, the machine code may not be generated. During source code execution, execution controller 308 may point to the generated machine code, which can be executed faster than interpreter 310 can interpret the bytecode portion.

For example, with respect to ECMAScript, an expression may have an object "o" that has a property "x" (represented as "o.x"), as shown in the "For" loop below:

```
For (i = 0; i < 1000; i++){
    y = y + o.x
}
```

The property "o.x" is not invariant if (1) o is directly modified (o=o2), (2) o.x is directly modified (o.x=10), (3) an explicit function call modifies o or o.x, or (4) an implicit function call modifies o or o.x. JIT compiler 312 may recognize (1), (2), or (3). However, (4) is difficult to determine statically. For instance, "y" or "o.x" may point to objects with a "valueof( )" member function overridden by a version that modifies "o.x" itself. As such, field hoisting module 906 may determine from profile data 320 that there were no implicit calls previously. In such case, the value may be loaded in a register in memory, where it may be rapidly accessed. JIT compiler 312 may compile bytecode into machine code that accesses the property value stored in the register. For instance, the property value may be loaded into a register referred to as "T1", which may be referenced in the generated machine code (e.g., "y=y+T1" in the example above). This increases program efficiency by avoiding the overhead of assuming that the property value may change from one execution iteration to a next execution iteration, as is possible in a dynamic language. Some runtime checks may be performed to ensure that no implicit calls occur. If an implicit call occurs during runtime, a bailout to interpreter 310 may be performed.

Redundant type checking (RTC) module 908 is configured to analyze profile data 320 to determine whether any implicit calls are present in bytecode 324 that may disallow JIT compiler 312 from performing redundant type checking. To perform redundant type checking, JIT compiler 312 may determine portions of bytecode 324 where an object has multiple properties, and similar type checking is being performed each time a property value of the object is loaded in bytecode 324. In such cases, JIT compiler 312 may compile the bytecode portion into machine code to more efficiently load the property values at the same time, and to perform the type checking for the multiple property values together, for the same object. RTC module 908 may analyze profile data 320 to determine whether between the two or more property values loads there are any implicit calls that may change the shape of the object. If no implicit calls are present, the machine code may be generated and used. If implicit calls are present, the machine code may not be generated. During source code execution, execution controller 308 may point to the generated machine code, which can be executed faster than interpreter 310 can interpret the bytecode portion.

For example, with respect to ECMAScript, an object "o" may have properties "x" and "y" (represented as "o.x" and "o.y") that are accessed at different times in source code, as shown below:

$z = o.x;$

...

$w = o.y$

RTC module 908 may check profile data 320 to determine whether any implicit calls are likely to be present between the two property value loads. If such property value loads are present without the intervening implicit calls being likely, JIT compiler 312 may compile the bytecode into machine code that enables the property value loadings and type checking to be performed together in a more unified manner. For instance, the property values may be loaded for both o.x and o.y at the same time, and the type checking may be performed together for o.x and o.y. This increases program efficiency by avoiding the overhead of separate iterations of property value loading and type checking.

CSE module 910 is configured to analyze profile data 320 to determine whether any implicit calls are present in bytecode 324 that may disallow JIT compiler 312 from performing common sub-expression elimination. To perform common sub-expression elimination, JIT compiler 312 may determine portions of bytecode 324 that contain a common expression being evaluated multiple times by interpreter 310 (e.g., a predetermined number of times, such as 2 times, 5 times, of other predetermined number of times). In such cases, the solution of the expression may be stored in a register in memory or other location, and JIT compiler 312 may compile the bytecode portion into machine code to reference the expression solution in the register or other location. CSE module 910 analyzes profile data 320 to determine whether between the expression evaluations there are any implicit calls that may change the expression value. If no implicit calls are present, the machine code may be generated and used. If implicit calls are present, the machine code may not be generated. Execution controller 308 may point to the generated machine code when the expression is encountered during execution, from which the expression solution can be loaded.

For example, with respect to ECMAScript, the expressions "y" and "w" may be same, but may be separately evaluated, as shown in an example below:

$y = a + b + c;$

...

$w = a + b + c;$

CSE module 910 may check profile data 320 to determine whether any implicit calls are likely to be present between the two expressions that change the expression value (e.g., such as b pointing to an object with a valueof( ) function that returns a different value each time). In such case, and if the implicit calls are determined to be unlikely (e.g., determined to not have occurred, determined to not have occurred with high probability (e.g., 90% probability of not occurring), etc.), JIT compiler 312 may cause the expression to be evaluated, and the solution to be stored in a register (e.g., referred to as "T1"). Furthermore, JIT compiler 312 may compile the bytecode into machine code that loads the property value from the register, rather than evaluating the expression, as follows:

$T1 = a + b + c;$ $y = T1;$

...

$w = T1;$

This increases program efficiency by avoiding the overhead of evaluating the expression multiple times.

Array bounds checking (ABC) module 912 is configured to analyze profile data 320 to check conditions where bytecode portions of bytecode 324 contain arrays. ABC module 912 may direct JIT compiler 312 (via signal 328) to compile a bytecode portion into machine code that more efficiently handles an array. For instance, ABC module 912 may check whether an object is an array, whether an index being applied to the array is within the preset bounds of the array, and if so, to enable JIT compiler 312 to generate machine that enables values for the array to be directly loaded from the array.

For example, with respect to ECMAScript, an array "A[i]" may be defined to have a length of "length" in a "For" loop, as shown below:

```
For (i = 0; i < A.length : i++)
{
    x = x + A[i]
}
```

In this example, ABC module 912 may check whether "A[i]" is an array, and whether a value of "i" is within the bounds of array "A[i]" (e.g., is less than "length"). If profile data 320 indicates that during previous iterations, the value of "i" has been within the preset bounds, ABC module 912 may direct JIT compiler 312 to compile a bytecode portion corresponding to the above code into machine code so that array values may be loaded directly from array "A[i]" stored in memory. This may increase program efficiency by avoiding the overhead of checking the array "A[i]" multiple times. However, if ABC module 912 determines that "i" has previously been outside bounds of array "A[i]", this optimization may not be made.

Typed array module (TAM) module 914 is configured to analyze profile data 320 to check conditions where bytecode portions of bytecode 324 contain a typed array being evaluated by interpreter 310 according to a particular type. If profile data 320 indicates that an array is consistently evaluated as having a same type (e.g., an integer array, a floating point array, a string array, etc.), ABC module 912 may direct JIT compiler 312 (via signal 328) to compile a bytecode portion into machine code that processes the array according to the specific type.

For example, with respect to ECMAScript, an array "A[i]" may be used in an expression, as shown in an example below:

$x+=A[i]$

ECMAScript supports various types of arrays, including a normal array that contains values of any type, a floating point array (only includes floating point numbers), an integer array (that includes only integers), etc. Without profile data 320, array "A[i]" may be considered to be a normal array. If profile data 320 indicates that array "A[i]" has previously included a single type, ABC module 912 may direct JIT compiler 312 (via signal 328) to compile a bytecode portion for the above expression into machine code that processes the array according to the specific type. This may increase program efficiency by avoiding the overhead of handling all possible types for the array "A[i]".

Constructor pattern module 916 is configured to analyze profile data 320 to determine whether any implicit calls are present in bytecode 324 that may disallow JIT compiler 312 from performing constructor pattern optimization. To perform a constructor pattern optimization, JIT compiler 312 may determine portions of bytecode 324 that indicate an object is being constructed during execution by interpreter 310. In such cases, JIT compiler 312 may compile the bytecode portion into machine code, to more efficiently construct the object. Constructor pattern module 916 analyzes profile data 320 to determine whether there are any implicit calls while constructing the object (because these implicit calls may have added/deleted fields). If no implicit calls are present, the machine code may be generated and used. If implicit calls are present, the machine code may not be generated. During source code execution, execution controller 308 may point to the generated machine code, which can be executed faster than interpreter 310 can interpret the bytecode portion.

For example, with respect to ECMAScript, an object "o" may be constructed by adding properties to it, such as the three properties "x", "y", and "w", in separate statements as shown in an example below:

o.x=1
    o.y=2
    o.w=3

In this example, prior to the above three statements, the object "o" does not include the properties "x", "y", and "w". As shown above for this example, a value is assigned to each property when the property is added to object "o". Constructor pattern module 916 may check profile data 320 to determine whether any implicit calls occur while constructing the object "o" that may change the shape of object "o". If the implicit calls are determined to be unlikely, JIT compiler 312 may compile the bytecode into machine code that adds the three properties to the object "o" in a single operation, and that captures the property values for the three properties. This increases program efficiency by avoiding the overhead of adding multiple properties to an object over multiple separate operations.

Field copy propagation (FCP) module 918 is configured to analyze profile data 320 to determine whether any implicit calls are present in bytecode 324 that may disallow JIT compiler 312 from performing field copy propagation. To perform field copy propagation, JIT compiler 312 may determine bytecode portions of bytecode 324 that contain references to an object property that was previously assigned a value. In such cases, JIT compiler 312 may compile the bytecode portion(s) into machine code that replaces the object property references with the previously assigned value. FCP module 918 analyzes profile data 320 to determine whether there are any implicit calls between the references that may change the property value. If no implicit calls are present, the machine code may be generated and used. If implicit calls are present, the machine code may not be generated. During source code execution, execution controller 308 may point to the generated machine code, which can be executed faster than interpreter 310 can interpret the bytecode portion(s).

For example, as shown below with respect to ECMAScript, a property "x" of an object "o" may be assigned a value "1", and subsequently, an object "y" may be assigned the value of the property value "x":

o.x = 1
    ...
    y = o.x

FCP module 918 may check profile data 320 to determine whether any implicit calls occur between the two operations with o.x (that may change the value of o.x). In such case, and if the implicit calls are determined to be unlikely, the expression of "o.x" may be replaced with the actual value of "1" (e.g., y=1). JIT compiler 312 may compile the bytecode into machine code that replaces "o.x" with the value "1". This increases program efficiency by avoiding the overhead of looking up the property value each time "o.x" is encountered in bytecode.

Startup module 920 is configured to cause startup bytecode to be executed first when a script is executed. For example, as described above, startup profiler 504 of FIG. 5 is configured to analyze bytecode 324 for bytecode that is used at the beginning of the execution of source code 208, and to indicate this "startup" bytecode in profile data 320. Startup module 920 of FIG. 9 is configured to cause the startup bytecode indicated in profile data 320 to be executed prior to other bytecode when a script begins execution.

Figure 10:
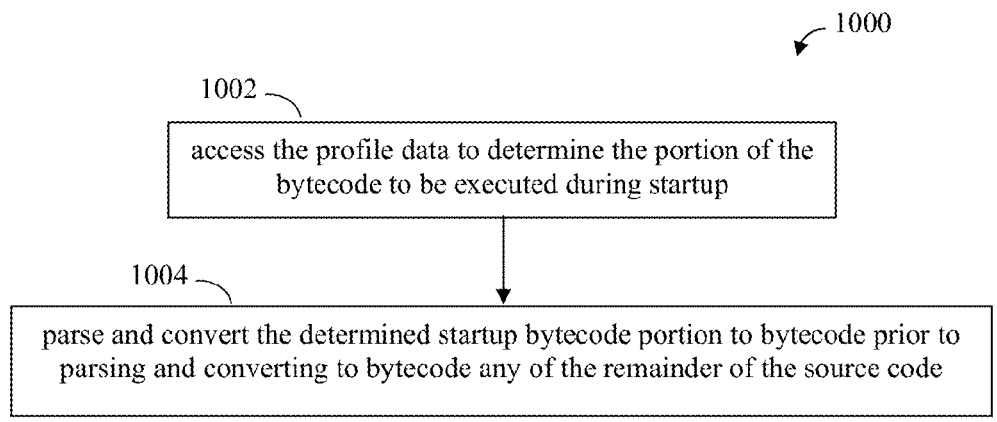
FIG. 10 depicts a flowchart of a method for using profile data to improve script startup, according to an example embodiment.

For instance, FIG. 10 depicts a flowchart 1000 of a method for using profile data to improve script startup, according to an example embodiment. In an embodiment, startup module 920 may perform the method of flowchart 1000. The method of flowchart 1000 is described as follows.

The method of flowchart 1000 begins with step 1002. In step 1002, the profile data is accessed to determine the portion of the bytecode to be executed during startup. As described above, startup module 920 may access profile data 320 to determine startup bytecode indicated to be executed at the beginning of execution of source code 208. In an embodiment, the startup bytecode may be associated with an identifier for source code 208. For example, in an embodiment, startup profiler 504 of FIG. 5 may generate a hash value or other identifier for source code 208 when identifying startup bytecode for source code 208. The hash value (or other identifier) may be indicated in profile data 320 with the indication of the startup bytecode. When source code 208 is again executed from the beginning, startup module 920 may generate a hash value (or other identifier) for source code 208, and may compare the generated hash value with the hash value stored in profile data 320 to identify source code 208 and its indicated startup bytecode. In other embodiments, the startup bytecode for source code 208 may be identified in profile data 320 in another manner.

In step 1004, the determined startup bytecode portion is parsed and converted to bytecode prior to parsing and converting to bytecode any of the remainder of the source code. For instance, once startup module 920 determines the startup bytecode in profile information 320, startup module 920 may instruct parser 304 of FIG. 3 to parse the portion of source code 208 corresponding to the startup bytecode prior to any other portion of source code 208. In this manner, bytecode generator 306 generates the startup bytecode first, and source code 208 can start executing more rapidly.

As such, compiled bytecode may be generated for portions of source code based on profile data. The compiled bytecode may be executed so that the source code may be executed more efficiently. Furthermore, the compiled bytecode may be saved to be used during future source code execution.

As described above, based on profile data, portions of a script may be compiled and executed on the fly rather than being interpreted to improve script execution efficiency. In embodiments, the profile data may be saved in persistent storage to be used later on during the current execution of the script, and/or to be used in future executions of the script. For instance, the profile data may be accessed in persistent storage, and cached in memory for use during subsequent script executions. During such subsequent script executions, additional profile data may or may not be generated. By accessing the previously generated profile data, a script may be executed more efficiently by using previously generated machine code.

Figure 11:
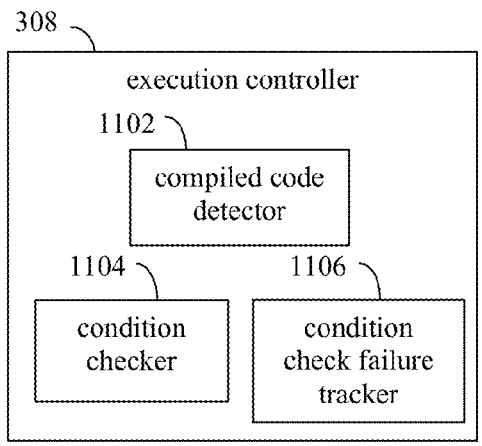
FIG. 11 is a block diagram of an execution controller configured for execution of stored compiled bytecode, according to an example embodiment.

Runtime engine 300 of FIG. 3 may operate to improve script execution performance using previously-generated profile data in various ways, in embodiments. For instance, FIG. 11 shows a block diagram of execution controller 308 of FIG. 3, according to an example embodiment. As shown in FIG. 11, execution controller 308 includes a compiled code (CC) detector 1102, a condition checker 1104, and a condition check failure (CCF) tracker 1106. Any one or more of these features may be included in execution controller 308, in embodiments. These features of execution controller 308 are described as follows.

CC detector 1102 is configured to check whether compiled bytecode for bytecode 324 currently to be executed has already been generated and stored in storage. For instance, FIG. 3 shows compiled bytecode 332 stored in storage 314. Compiled bytecode 332 includes compiled bytecode that was previously generated by JIT compiler 312 for execution. If CC detector 1102 determines that compiled bytecode exists in storage for a portion of bytecode 324 that is about to be executed, CC detector 1102 may cause the compiled bytecode to be executed (e.g., by machine code executer 316) instead of bytecode being interpreted by interpreter 310 or being compiled by JIT compiler 332.

Condition checker 1104 is configured to perform one or more checks on compiled bytecode (e.g., compiled bytecode 332) to verify that conditions expected by the compiled bytecode are satisfied. If one or more of the expected conditions fail, condition checker 1104 may point execution of bytecode 324 to interpreter 310, which executes the bytecode 324 at the appropriate point, rather than executing compiled bytecode 332.

CCF tracker 1106 is configured to track condition failures determined by condition checker 1104. CCF tracker 1106 may maintain statistics about the failed conditions, and if a sufficient number of failed conditions for a compiled bytecode portion is registered, CCF tracker 1106 may instruct JIT compiler 312 to compile a new version of the compiled bytecode portion (to replace the compiled bytecode portion having failures).

Figure 12:
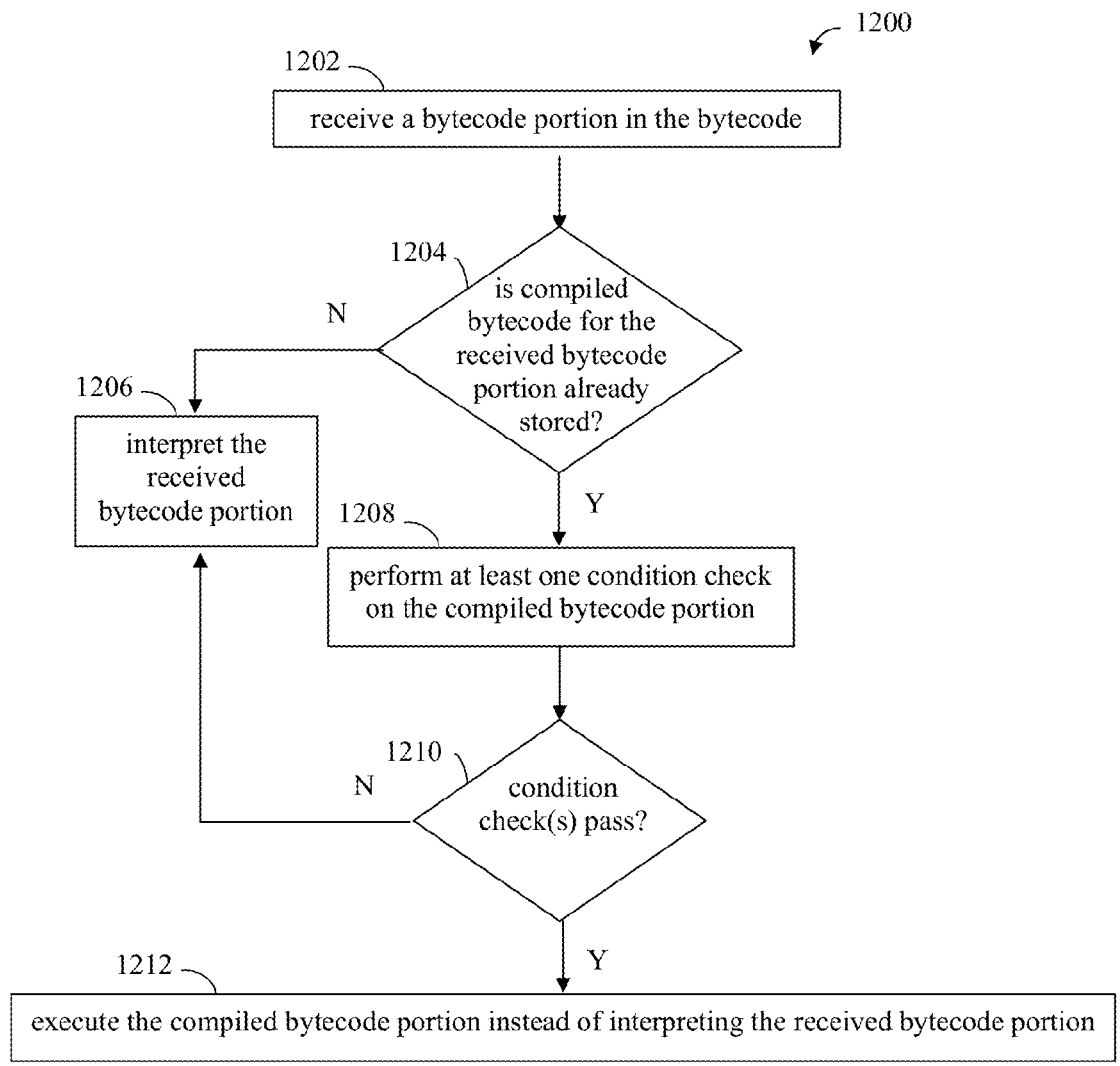
FIG. 12 depicts a flowchart of a method for executing a script, according to an example embodiment.

FIG. 12 depicts a flowchart 1200 of a method for executing a script, according to an example embodiment. In an embodiment, runtime engine 300 of FIG. 3 may perform the method of flowchart 1200. Further structural and operational embodiments will be apparent to persons skilled in the relevant art(s) based on the following discussion regarding the method of flowchart 1200. The method of flowchart 1200 is described as follows.

The method of flowchart 1200 begins with step 1202. In step 1202, a bytecode portion in the bytecode is received. For example, as shown in FIG. 3, a bytecode portion (e.g., a function, a loop, etc.) is received by execution controller 308 in bytecode 324.

In step 1204, whether compiled bytecode for the received bytecode portion is already stored is determined. For example, referring to FIG. 11, CC detector 1102 may determine whether compiled bytecode exists in storage 314 of FIG. 3 for the received portion of bytecode 324. If the compiled bytecode is not present, operation proceeds from step 1204 to step 1206. If the compiled bytecode is present, operation proceeds from step 1204 to step 1208.

In step 1206, the received bytecode portion is interpreted. Interpreter 310 of FIG. 3 may by enabled by execution controller 308 to interpret the bytecode portion of bytecode 324 because a compiled version of the bytecode portion does not already exist. For instance, in an embodiment, execution controller 308 may point execution of bytecode 324 to an address of interpreter 310, or may enable interpreter 310 to interpret the bytecode portion in other manner.

Note that alternatively, rather than performing step 1206 to interpret the bytecode portion, operation may proceed from step 1204 to step 802 of flowchart 800 (FIG. 8), to determine whether the bytecode portion may be optimized.

In step 1208, at least one condition check is performed on the compiled bytecode portion. In an embodiment, condition checker 1104 of FIG. 11 may perform one or more condition checks on the compiled bytecode portion that already exists in storage 314. For instance, one or more condition checks may be performed depending on the particular code execution optimizer module (FIG. 9) that was used to generate the compiled bytecode portion.

For instance, machine code for a second function may be generated by inlining module 902 to be inlined into a first function in bytecode 324 due to prior history indicated in profile data 310. However, if condition checker 1104 determines in a subsequent execution that a different function from the second function is performed in bytecode 324 during the first function, a failed condition occurs.

The other code optimizer modules of FIG. 9 may rely on no changes occurring to relevant objects, properties, types, expressions, calls to functions, and/or other bytecode features in bytecode 324. However, if such a change occurs, a failed condition may occur. For example, TS module 904 may assume that a type change to a relevant object does not occur; field hoisting module 906 may assume that hidden/implicit calls that change relevant property values do not occur; RTC module 908 may assume that a change to the structure of a relevant object does not occur; CSE module 910 may assume that hidden/implicit calls that change relevant object values do not occur; ABC module 912 may assume that an array index value does not go out of bounds; typed array module 914 may assume that changes to types of relevant arrays do not occur; constructor pattern module 916 may assume that changes to values of any of the expression objects do not occur; and FCP module 918 may assume that a relevant object property value is not changed. For each of these optimizations, if a critical assumption turns out to be incorrect, a condition failure occurs.

In step 1210, whether the condition check(s) passed is determined. If a condition check of step 1208 fails, operation proceeds from step 1210 to step 1206. If the condition check(s) of step 1210 passes, operation proceeds from step 1210 to step 1212.

In step 1212, the compiled bytecode portion is executed instead of interpreting the received bytecode portion. For instance, because compiled bytecode exists for a portion of bytecode 324, and any condition checks for the compiled bytecode portion passed, the compiled bytecode portion may be executed. In an embodiment, execution controller 308 may point execution of the compiled bytecode portion in storage 314 to an address of machine code executer 316, or may enable machine code executer 316 to execute the compiled bytecode portion in any other manner. For example, as shown in FIG. 3, compiled bytecode 330 is received at machine code executer 316 to be executed.

Note that if operation proceeds from step 1210 to step 1206 due to a condition failure, a "bailout" may be said to have occurred. In a "bailout," instead of executing already compiled bytecode, the corresponding bytecode portion in bytecode 324 is interpreted by interpreter 310. Such as bailout is a relatively expensive process, as slower interpretation of bytecode is performed rather than executing machine code. As such, in an embodiment, rather than performing a bailout due to a condition failure, a code module (e.g., "helper code") that is configured to correct the failed condition may be performed, and execution of the compiled bytecode portion may continue. Such helper code may be generated for any one or more of the code execution optimizer modules described above. For instance, with regard to TS module 904 and typed array module 914, helper code may be executed to handle the undesired type change that occurred.

Figure 13:
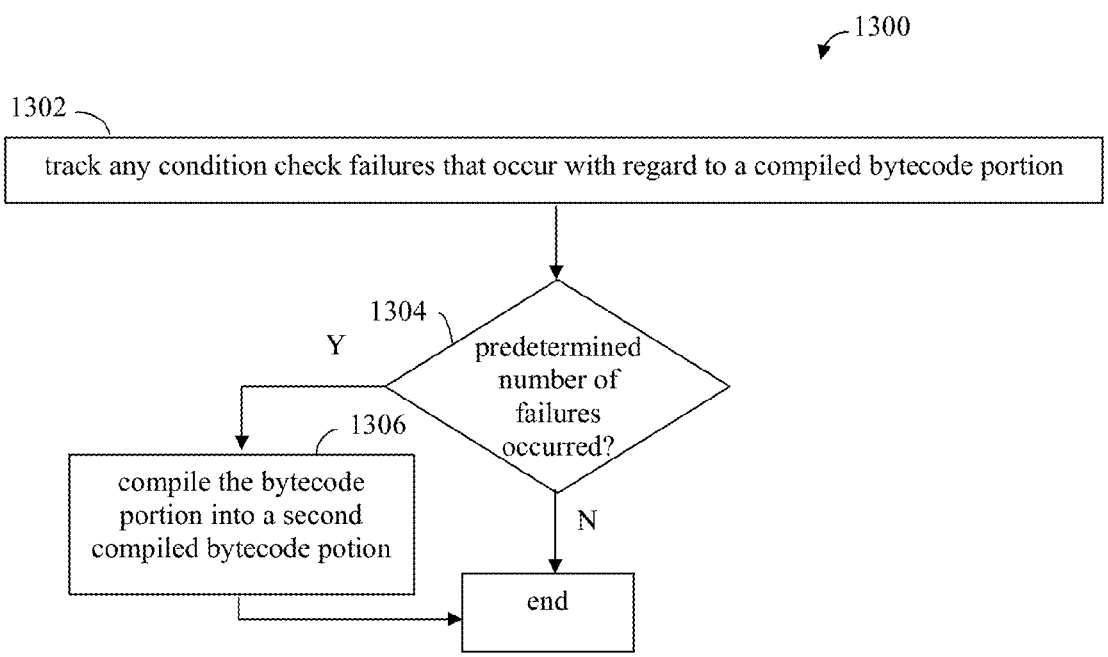
FIG. 13 depicts a flowchart of a method for tracking condition checks of compiled bytecode, according to an example embodiment.

Condition check failure (CCF) tracker 1106 of FIG. 11 may perform its functions in various ways. For instance, FIG. 13 depicts a flowchart 1300 of a method for tracking the condition checking of compiled bytecode, according to an example embodiment. Further structural and operational embodiments will be apparent to persons skilled in the relevant art(s) based on the following discussion regarding the method of flowchart 1300.

The method of flowchart 1300 begins with step 1302. In step 1302, any condition check failures that occur with regard to a compiled bytecode portion is/are tracked. For example, as described above with respect to FIG. 11, CCF tracker 1106 may record any condition failures detected by condition checker 1104. For instance, CCF tracker 1106 may maintain a table or other data structure in storage (e.g., in memory) that indicates one or more compiled bytecode portions (e.g., by corresponding identifiers, etc.) that have had condition failures, and indicates a number of condition failures that have occurred for each indicated compiled bytecode portion.

In step 1304, whether a predetermined number of condition check failures have occurred is determined. In an embodiment, CCF tracker 1106 may compare the indicated number of condition failures for compiled bytecode portions to a predetermined unacceptable number of condition failures (e.g., 1, 2, 5, or other value).

In step 1306, the bytecode portion is compiled into a second compiled bytecode portion. For instance, in an embodiment, for each compiled bytecode portion that reaches the predetermined number of condition failures, CCF tracker 1106 may instruct JIT compiler 312 to recompile the bytecode corresponding to the failed compiled bytecode portion to generate a new compiled bytecode portion. The prior version of the complied bytecode portion may be deleted, and the new compiled bytecode portion may be stored in storage 314 for future access.

III. Example Test Strategy for Profile-Guided Code Execution Optimizers

The preceding section provided an example of a system that is designed to optimize the execution of code within an application or other computer program. In particular, the preceding section provided an example of a system that is designed to optimize the execution of scripts written in a dynamic programming language based on profile data collected during the execution of such scripts. Embodiments will now be described that may be used to test such a system. It is noted, however, that the testing techniques described herein are not limited to testing the system for optimized code execution described in the preceding section, but may be used to test any system that can optimize the execution of a script (or other code) based on profile data that is collected during execution thereof.

Figure 14:
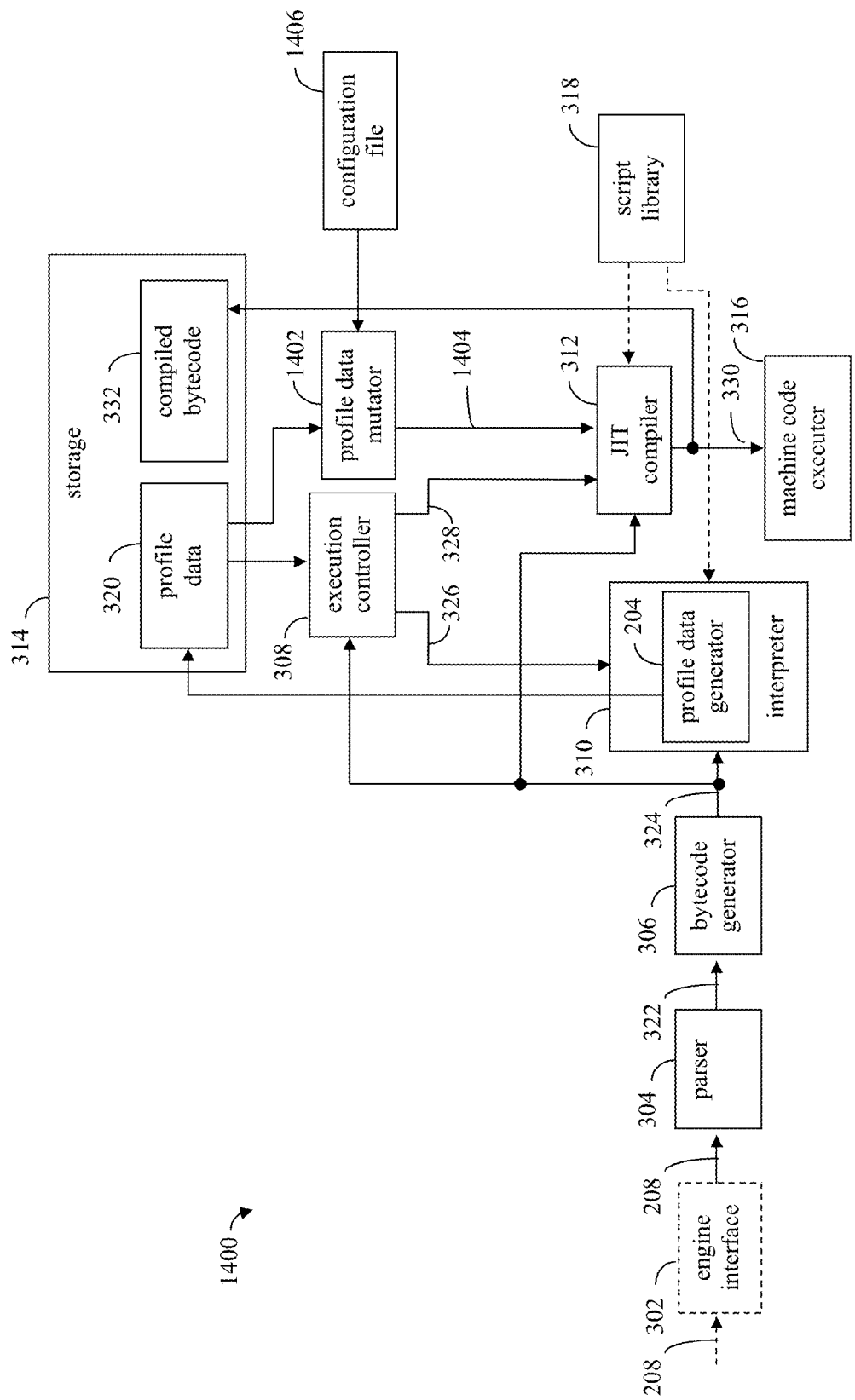
FIG. 14 is a block diagram of a system that may be used to test a system for optimized code execution, according to an embodiment.

FIG. 14 is a block diagram of a system 1400 that may be used to test the system for optimized code execution described in the preceding section. As shown in FIG. 14, system 1400 includes each of the elements of runtime engine 300. These elements operate in the manner described above. As also shown in FIG. 14, system 1400 further includes a profile data mutator 1402. Profile data mutator 1402 operates to mutate or modify profile data 320 between the point when it is collected and the point when it is used by JIT compiler 312 to apply an optimization by selectively compiling a portion of a script. By mutating the profile data at this point, testing of a system for optimized code execution can be significantly more thorough. For example, if profile data is collected that indicates that a particular variable included in the script is an integer, mutating that profile data can cause system 1400 to implement an optimization that treats the variable as a floating point number. The result is that a different optimization will be applied, improving the testing coverage, without having to change the script.

Figure 15:
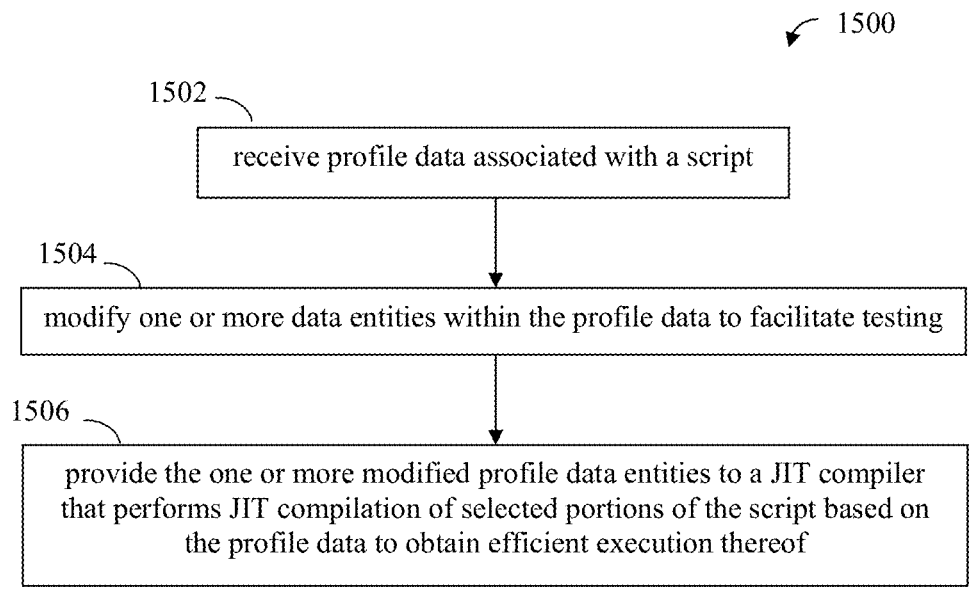
FIG. 15 depicts a flowchart of a method for testing a system for optimized code execution in accordance with an embodiment.

FIG. 15 depicts a flowchart 1500 of a method for testing a system for optimized code execution in accordance with an embodiment. The method of flowchart 1500 may be used to test a system, such as system 300 of FIG. 3, which is configured to execute a script, to collect profile data concerning the script during execution thereof, and to perform JIT compilation of selected portions of the script based on the profile data to obtain efficient execution thereof. In an embodiment, profile data mutator 1402 of FIG. 14 may perform the method of flowchart 1500. Further structural and operational embodiments will be apparent to persons skilled in the relevant art(s) based on the following discussion regarding the method of flowchart 1500. The method of flowchart 1500 is described as follows.

As shown in FIG. 15, the method of flowchart 1500 begins at step 1502 in which profile data associated with a script is received. This step may be performed, for example, by profile data mutator 1402 which receives profile data 320 when such profile data 320 is to be provided to JIT compiler 312 to implement a particular code execution optimization. The particular code execution optimization may be determined by execution controller 308 in a manner previously described and may include, for example, any one of the code execution optimizations discussed above in reference to FIG. 9. Thus, for example, the code execution optimization may relate to inlining, type specialization, field hoisting, redundant type checking, common sub-expression elimination, array bounds checking, typed arrays, constructor optimizations, or field copy propagation. This list is not intended to be exhaustive, however, and the profile data may be received pursuant to implementing other types of code execution optimizations.

At step 1504, one or more profile data entities within the profile data are modified to facilitate testing. This step may also be performed by profile data mutator 1402 to produce one or more modified profile data entities 1404 as shown in FIG. 14. Examples of various types of profile data entities that may be modified and various ways in which such profile data entities may be modified will be provided below.

At step 1506, the one or more modified profile data entities are provided to a JIT compiler that performs JIT compilation of selected portions of the script based on the profile data to obtain efficient execution thereof. This step may also be performed by profile data mutator 1402 which provides one or more modified profile data entities 1404 to JIT compiler 312. JIT compiler 312 uses the one or more modified profile data entities, rather than the original unmodified version of such modified profile data entities, to perform JIT compilation of selected portions of the script. The result is that a different optimization is applied than would have been applied if JIT compiler 312 had received unmodified versions of the one or more profile data entities.

A variety of different kinds of profile data entities may be generated by profile data generator 204 and thus a variety of different kinds of profile data entities may be mutated by profile data mutator 1404. To help illustrate this, it is observed that there are several sites within a script at which profile data may be collected by profile data generator 204. By way of example, consider the following ECMAScript code:

```
var x = ...;
var array = ...;
function g( ) { ... };
var obj = ...;
function f(a)
{
    x += /*1*/ /*2*/ g( );
    x += /*3*/ array[5];
    x += /*4*/ /*6*/ a;
    x += /*5*/ /*6*/ obj.prop;
    x += /*7*/ 5 / x;
}
```

Each site in "f" at which profile data may be collected is annotated with a comment. Table 1, below, provides details on what the profile data collected is, and the kind of profile data.

TABLE 1

Examples of Profile Data Entities that May be Collected/Mutated

| Site | Profile Data Kind | Description |
|---|---|---|
| 1 | TYPE | Type of the return value of the function |
| 2 | TARGET | Call target of the function |
| 3 | ARRAY TYPE | Type of the value loaded from the array |
| 4 | TYPE | Type of the function parameter |
| 5 | TYPE | Type of the property loaded from the object |
| 6 | IMPLICIT CALL | Any implicit code execution that may not be statically detectable |
| 7 | TYPE | Type of result of division |

The examples provided above in Table 1 are not intended to be limiting and persons skilled in the relevant art(s) will appreciate that other profile data entities may be collected/mutated in accordance with alternate embodiments.

Table 1 helps illustrate that there are several kinds of profile data entities that may be collected and thus mutated. Mutating a profile data entity may comprise changing the profile data entity from a first valid value for the profile data entity to a second valid value for the profile data entity. Table 2 below provides a summary of the various kinds of profile data that may be collected and mutated in accordance with one example embodiment, and the values that profile data of that kind may be mutated to.

TABLE 2

Kinds of Profile Data Entities and Associated Valid Values

| Kind | Possible values |
|---|---|
| TYPE | unknown, tagged integer, integer, number, string, non-number/integer/string |
| ARRAY TYPE | mixed, number, integer, tagged integer, string, character, uint8, uint16, uint32, int8, int16, int32, float32, float64, boolean, pixel data |
| TARGET | a reference to a function that may be called |
| IMPLICIT CALL | no implicit calls, toString, valueOf, property accessor |

The examples provided above in Table 2 are not intended to be limiting and persons skilled in the relevant art(s) will appreciate that other kinds of profile data entities may be collected and mutated in accordance with alternate embodiments. Furthermore, persons skilled in the relevant art(s) will appreciate that profile data entities may have valid values other than those shown in Table 2 in accordance with alternate embodiments.

The particular technique used to mutate the profile data can take a number of forms, including but not limited to: (1) random mutations; (2) user-specified mutations for each kind of field in the profile data; and (3) user-specified mutations for each field in the profile data. In accordance with technique (1), of the possible legal or valid values for each entity in the profile data, a random value is chosen. That is to say, each profile data entity is modified from a first valid value to a second randomly-selected valid value. In accordance with technique (2), all fields in the profile data of a particular type are given the same mutation as specified by a tester. In accordance with technique (3), the tester specifies a mutation for each field in the profile data.

To help illustrate each of these three approaches, consider the following code:

```
var x = ...;
var array = ...;
function f(a,b,c)
{
    x += /*1*/ array[5];
    x += /*2*/ array[5];
    x += /*3*/ array[5];
    x += /*4*/ a;
    x += /*5*/ b;
    x += /*6*/ c;
}
```

Again, the comments illustrate the sites in the code where profile data is collected by profile data generator 204.

In one embodiment, if a tester chooses to utilize the random mutation technique, each site at which profile data is collected will receive random profile data. The profile data that profile data mutator 1402 creates is valid for the kind of profile data being collected. Thus, for the above code, an example of a random mutation might be:

TABLE 3

Example of Random Mutation Approach

| Site | Profile Data Kind | Before Mutation | After Mutation |
|---|---|---|---|
| 1 | ARRAY TYPE | integer | string |
| 2 | ARRAY TYPE | integer | number |
| 3 | ARRAY TYPE | integer | float32 |

TABLE 3-continued

Example of Random Mutation Approach

| Site | Profile Data Kind | Before Mutation | After Mutation |
|---|---|---|---|
| 4 | TYPE | number | string |
| 5 | TYPE | number | non-number/ integer/string |
| 6 | TYPE | number | integer |

This kind of mutation may be useful for "fuzz" testing the code execution optimizer that consumes the profile data, finding potential issues by passing in many unexpected inputs.

In an embodiment in which a tester specifies mutations for each kind of entity in the profile data, the test may choose to broadly mutate each kind of profile data entity in the same way. For example, the specified mutations may be:

TABLE 4

Example of Approach in which Mutations are Specified by Kind

| Location | Profile Data Kind | Before Mutation | After Mutation |
|---|---|---|---|
| 1 | ARRAY TYPE | integer | string |
| 2 | ARRAY TYPE | integer | string |
| 3 | ARRAY TYPE | integer | string |
| 4 | TYPE | number | integer |
| 5 | TYPE | number | integer |
| 6 | TYPE | number | integer |

This sort of mutation may be useful in stress testing the code execution optimizer's consumption of particular values for profile data entities.

In an embodiment in which a tester specifies mutations for each entity in the profile data, the tester may choose to directly specify the mutation applied to a profile data entity associated with a particular location in the script. Using this technique, the tester would be able to directly specify that, for example, location #1 in the code shown above would receive profile data value "string". This kind of mutation can be useful to test combinations of profile data across different locations, or to annotate real world code to test failure scenarios.

The foregoing examples of methods for mutating profile data entities are provided herein by way of example only and are not intended to be limiting. Based on the teachings provided herein, persons skilled in the relevant art(s) will readily appreciate that still other methods may also be used to mutate profile data entities in accordance with alternate embodiments.

One the profile data has been mutated, it may then be used to test the system for optimized code execution. For example, in one implementation, an automated tool that crawls web sites and applications (i.e., a so-called webcrawler) is utilized to obtain scripts for execution by system 1400 while profile data mutator 1402 is operating to mutate collected profile data. Such automated tool may be executed by a same machine upon which system 1400 is running, although this is only and example and is not intended to be limiting.

System 1400 may also provide a means by which a tester can specify a mutation technique to be applied by profile data mutator 1402. For example, a tester may specify the mutation technique with a series of flags or other indicator(s) that are passed to profile data mutator 1402. In the embodiment shown in FIG. 14, the indicator(s) are stored within a configuration file 1406 that can be accessed and edited by the tester. The indicator(s) set within configuration file 1406 by the tester are then passed to profile data mutator 1402 and profile data mutator applies a particular mutation technique based on the value of the indicator(s). However, this is only one example of a method by which a tester can control profile data mutator to apply a specific mutation technique and still other methods may be used. For example, such indicator(s) could be included within a registry key that is passed to profile data mutator 1402. As another example, command line arguments or parameters may be input by the tester to specify the desired mutation technique. As still another example, a graphical user interface may be displayed to the tester that enables the tester to choose which profile data entities to mutate and how to mutate them. In an alternate implementation, profile data mutator 1402 may not be controllable by a tester and may apply profile data mutations in a fixed manner.

By using the modified profile data output by profile data mutator 1402, much more thorough coverage of optimizations and recovery scenarios is obtained as compared to traditional testing techniques such as manual testing or directed testing. This leads to a more scalable and efficient testing technique for profile-guided systems for optimized code execution. Thus, embodiments described herein enable a scalable, machine-driven method of testing the functional correctness of a profile-guided system for optimized code execution, by mutating the profile data during code execution.

Figure 16:
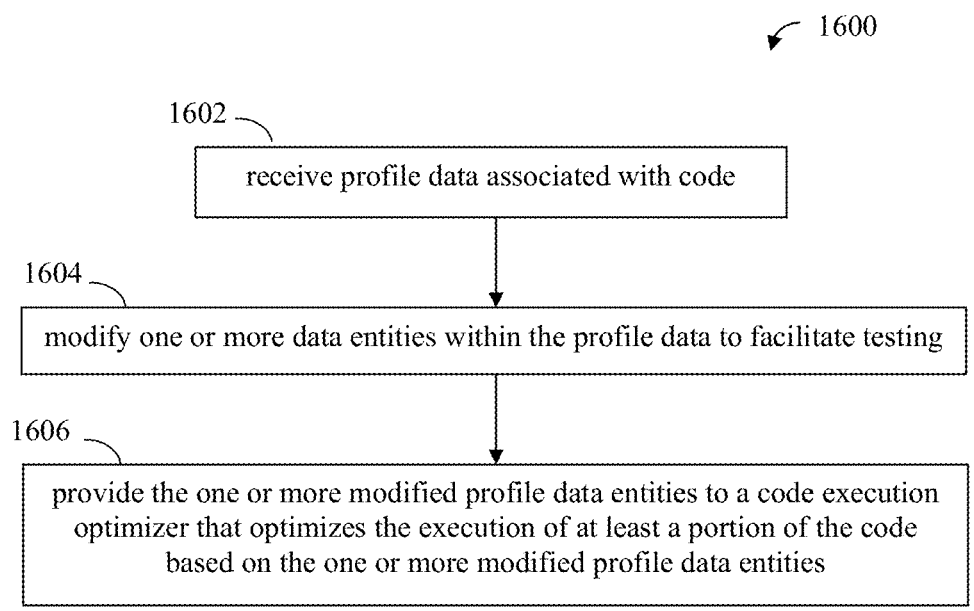
FIG. 16 depicts a flowchart of a generalized method for testing a profile-guided code execution optimizer in accordance with an embodiment.

As previously noted, the testing techniques described herein are not limited to the profile-guided code execution optimization system described in the preceding section, but instead may be used to test any system that can optimize the execution of a script (or other code) based on profile data that is collected during execution thereof. To help illustrate this, FIG. 16 depicts a flowchart 1600 of a generalized method for testing a profile-guided code execution optimizer in accordance with an embodiment. As shown in FIG. 16, the method of flowchart 1600 begins at step 1602 in which profile data associated with code is received. At step 1604, one or more data entities with the profile data received during step 1602 are modified to facilitate testing of the profile-guided code execution optimizer. At step 1606, the one or modified profile data entities are provided to the profile-guided code execution optimizer, which uses the modified profile data entities to implement an execution optimization to at least a portion of the code.

IV. Example Computing Device Embodiments

Figure 17:
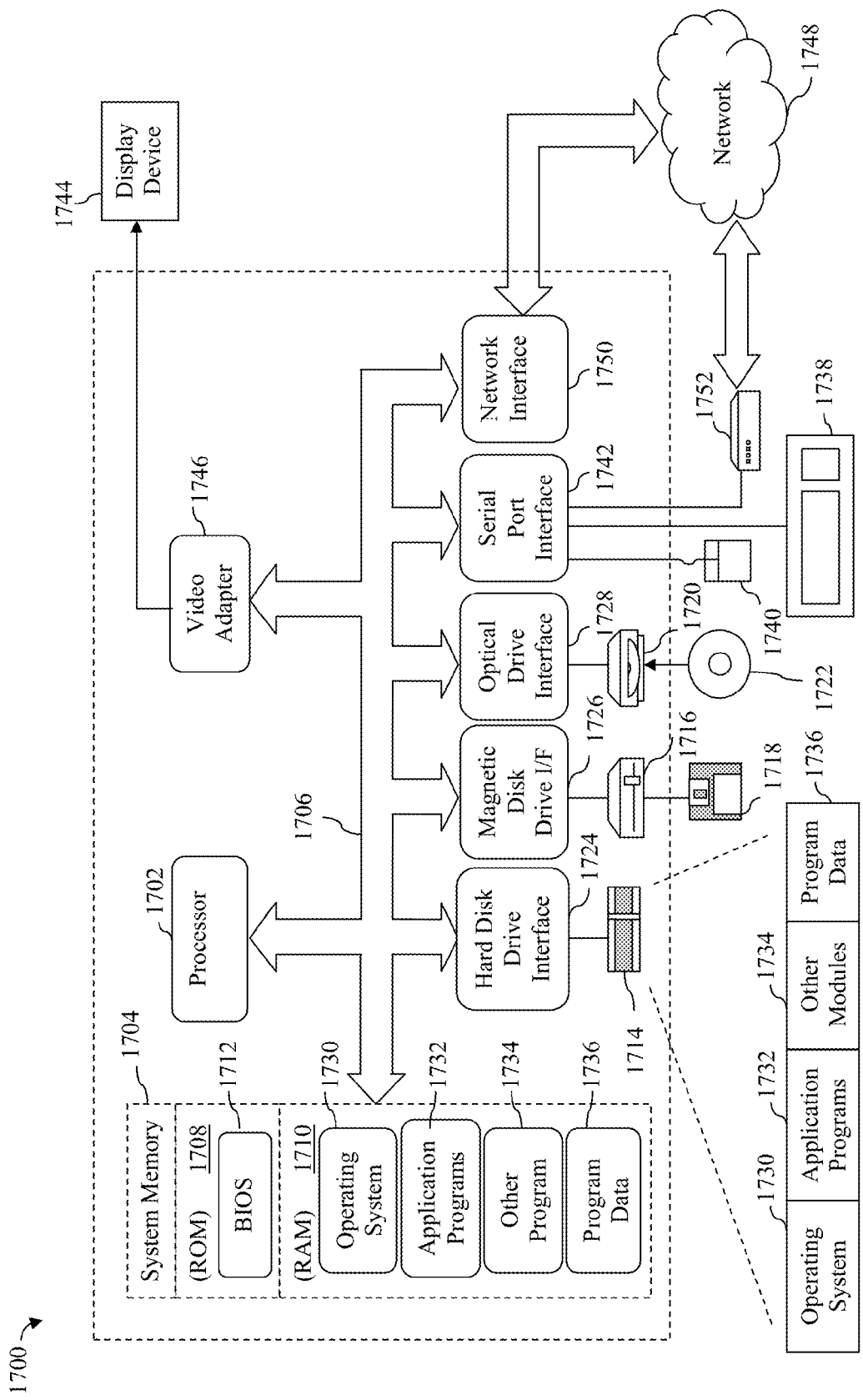
FIG. 17 shows a block diagram of an example computer that may be used to implement embodiments of the present invention.

FIG. 17 depicts an example processor-based computer system 1700 that may be used to implement various embodiments described herein. For example, system 1700 may be used to implement computing device 102, server 104, runtime engine 202, runtime engine 300, system 1400, or any of the components thereof. System 1700 may also be used to implement the methods of any of flowcharts 400, 600, 700, 800, 1000, 1200, 1300, 1500 and 1600. The description of system 1700 provided herein is provided for purposes of illustration, and is not intended to be limiting. Embodiments may be implemented in further types of computer systems, as would be known to persons skilled in the relevant art(s).

As shown in FIG. 17, system 1700 includes a processing unit 1702, a system memory 1704, and a bus 1706 that couples various system components including system memory 1704 to processing unit 1702. Processing unit 1702 may comprise one or more processors or processing cores. Bus 1706 represents one or more of any of several types of bus structures, including a memory bus or memory controller, a peripheral bus, an accelerated graphics port, and a processor or local bus using any of a variety of bus architectures. System memory 1704 includes read only memory (ROM) 1708 and random access memory (RAM) 1710. A basic input/output system 1712 (BIOS) is stored in ROM 1708.

System 1700 also has one or more of the following drives: a hard disk drive 1714 for reading from and writing to a hard disk, a magnetic disk drive 1716 for reading from or writing to a removable magnetic disk 1718, and an optical disk drive 1720 for reading from or writing to a removable optical disk 1722 such as a CD ROM, DVD ROM, BLU-RAY™ disk or other optical media. Hard disk drive 1714, magnetic disk drive 1716, and optical disk drive 1720 are connected to bus 1706 by a hard disk drive interface 1724, a magnetic disk drive interface 1726, and an optical drive interface 1728, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1730, one or more application programs 1732, other program modules 1734, and program data 1736. In accordance with various embodiments, the program modules may include computer program logic that is executable by processing unit 1702 to perform any or all of the functions and features of any of computing device 102, server 104, runtime engine 202, runtime engine 300, or system 1400 as described above as well as any components included therein. The program modules may also include computer program logic that, when executed by processing unit 1702, performs any of the steps or operations shown or described in reference to flowcharts 400, 600, 700, 800, 1000, 1200, 1300, 1500 and 1600.

A user may enter commands and information into system 1700 through input devices such as a keyboard 1738 and a pointing device 1740. Other input devices (not shown) may include a microphone, joystick, game controller, scanner, or the like. In one embodiment, a touch screen is provided in conjunction with a display 1744 to allow a user to provide user input via the application of a touch (as by a finger or stylus for example) to one or more points on the touch screen. These and other input devices are often connected to processing unit 1702 through a serial port interface 1742 that is coupled to bus 1706, but may be connected by other interfaces, such as but not limited to a parallel port, game port, or a universal serial bus (USB).

A display 1744 is also connected to bus 1706 via an interface, such as a video adapter 1746. In addition to display 1744, system 1700 may include other peripheral output devices (not shown) such as speakers and printers.

System 1700 is connected to a network 1748 (e.g., a local area network or wide area network such as the Internet) through a network interface or adapter 1750, a modem 1752, or other suitable means for establishing communications over the network. Modem 1752, which may be internal or external, is connected to bus 1706 via serial port interface 1742.

As used herein, the terms "computer program medium," "computer-readable medium," and "computer-readable storage medium" are used to generally refer to media such as the hard disk associated with hard disk drive 1714, removable magnetic disk 1718, removable optical disk 1722, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1732 and other program modules 1734) may be stored on the hard disk, magnetic disk, optical disk, ROM, or RAM. Such computer programs may also be received via network interface 1750, serial port interface 1742, or any other interface type. Such computer programs, when executed or loaded by an application, enable system 1700 to implement features of embodiments of the present invention discussed herein. Accordingly, such computer programs represent controllers of system 1700.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

In alternative implementations, any of computing device 102, server 104, runtime engine 202, runtime engine 300, system 1400, or any of the components thereof may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
one or more processing units; and
a memory coupled to the one or more processing units, the memory storing software modules for execution by the one or more processing units, the software modules comprising:
 a runtime engine that is configured to execute a script, to collect profile data concerning the script during execution thereof, and to perform just-in-time (JIT) compilation of selected portions of the script based on the profile data to obtain efficient execution thereof in accordance with an optimization; and
 a profile data mutator that is configured to:
  modify one or more profile data entities within the profile data to facilitate testing of the runtime engine; and
  test the runtime engine by performing at least changing a value of each profile data entity from a first valid value to a second randomly-determined valid value, the runtime engine being configured to execute the script in accordance with the second randomly-determined valid value to obtain efficient execution thereof based on a previously-untested optimization.

2. The system of claim 1, wherein the script is coded in a dynamic programming language.

3. The system of claim 1, wherein the runtime engine is configured to execute a byte code representation of the script, to collect profile data concerning the byte code representation of the script during execution thereof, and to perform JIT compilation of selected portions of the byte code representation of the script based on the profile data to obtain efficient execution thereof.

4. The system of claim 1, wherein the profile data mutator is configured to modify one or more kinds of profile data entities, the one or more kinds of profile data entities including one or more of:
a type of a return value of a function;
a call target of a function;
a type of a value loaded from an array;
a type of a function parameter;
a type of a property loaded from an object;
an implicit code execution that may not be statically detectable; and
a type of a result of a division.

5. The system of claim 1, wherein the profile data mutator is configured to modify profile data entities of a kind specified by a user.

6. The system of claim 1, wherein the profile data mutator is configured to modify a user-specified profile data entity associated with a particular location within the script.

7. The system of claim 1, wherein the profile data mutator is configured to identify the one or more profile data entities to be modified based on information stored in a configuration file.

8. The system of claim 1, wherein the profile data mutator is configured to identify the one or more profile data entities to be modified based on information stored in a registry key.

9. The system of claim 1, wherein the profile data mutator is configured to identify the one or more profile data entities to be modified based on user input received via a user interface.

10. The system of claim 1, wherein the memory further stores:
an automated tool configured to sequentially access a plurality of web pages that include web page scripts and to provide the web page scripts to the runtime engine for execution.

11. A computer-implemented method for testing a runtime engine that is configured to execute a script, to collect profile data concerning the script during execution thereof, and to perform just-in-time (JIT) compilation of selected portions of the script based on the profile data to obtain efficient execution thereof in accordance with an optimization to the script, the method comprising:
modifying one or more profile data entities within the profile data, said modifying comprising changing a value of each profile data entity from a first valid value to a second randomly-determined valid value; and
testing the runtime engine by providing the one or more modified profile data entities to a JIT compiler that performs the JIT compilation of the selected portions of the script based on the profile data to obtain efficient execution thereof based on a previously-untested optimization.

12. The method of claim 11, wherein modifying the one or more profile data entities further comprises modifying one or more kinds of profile data entities, the one or more kinds of profile data entities including one or more of:
a type of a return value of a function;
a call target of a function;
a type of a value loaded from an array;
a type of a function parameter;
a type of a property loaded from an object;
an implicit code execution that may not be statically detectable; and
a type of a result of a division.

13. The method of claim 11, wherein modifying the one or more profile data entities further comprises modifying profile data entities of a kind specified by a user.

14. The method of claim 11, wherein modifying the one or more profile data entities further comprises modifying a user-specified profile data entity associated with a particular location within the script.

15. The method of claim 11, wherein modifying the one or more profile data entities further comprises identifying the one or more profile data entities to be modified based on information stored in a configuration file, information stored in a registry key, or user input received via a user interface.

16. The computer-implemented method of claim 11, wherein the script is coded in a dynamic programming language.

17. The computer-implemented method of claim 11, wherein the system is configured to execute a byte code representation of the script, to collect profile data concerning the byte code representation of the script during execution thereof, and to perform JIT compilation of selected portions of the byte code representation of the script based on the profile data to obtain efficient execution thereof.

18. A method for testing a profile-guided code execution optimizer that is configured to execute code, to collect profile data concerning the code during execution thereof, and to implement optimizations to the execution of the code based on the profile data, the method comprising:
receiving the profile data;
modifying one or more profile data entities within the profile data, said modifying comprising performing at least changing a value of each profile data entity from a first valid value to a second randomly-determined valid value; and testing the profile-guided code execution optimizer by providing the one or more modified profile data entities to the profile-guided code execution optimizer that optimizes at least a portion of the code based on the one or more modified profile data entities based on a previously-untested optimization.

19. The method of claim 18, wherein modifying the one or more profile data entities comprises modifying one or more kinds of profile data entities, the one or more kinds of profile data entities including one or more of:

a type of a return value of a function;
a call target of a function;
a type of a value loaded from an array;
a type of a function parameter;
a type of a property loaded from an object;
an implicit code execution that may not be statically detectable; and
a type of a result of a division.

20. The method of claim 18, wherein modifying the one or more profile data entities further comprises performing one or more of:

modifying profile data entities of a kind specified by a user; and
modifying a user-specified profile data entity associated with a particular location within the script.

* * * * *